US012677042B2

(12) United States Patent　　　　(10) Patent No.:　US 12,677,042 B2
Xie et al.　　　　　　　　　　　　　(45) Date of Patent:　　　Jul. 7, 2026

(54) METHOD, APPARATUS, ELECTRONIC DEVICE, AND STORAGE MEDIUM FOR PROCESSING LIVE STREAMING INFORMATION

(71) Applicant: TENCENT TECHNOLOGY (SHENZHEN) COMPANY LIMITED, Shenzhen (CN)

(72) Inventors: Yingxue Xie, Shenzhen (CN); Lin Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 488 days.

(21) Appl. No.: 17/888,838

(22) Filed: Aug. 16, 2022

(65) Prior Publication Data

US 2022/0394344 A1　　　Dec. 8, 2022

Related U.S. Application Data

(63) Continuation of application No. PCT/CN2021/107002, filed on Jul. 19, 2021.

(30) Foreign Application Priority Data

Aug. 31, 2020　(CN) .......................... 202010894864.8

(51) Int. Cl.
H04N 21/4788　　　(2011.01)
H04N 21/2187　　　(2011.01)
(Continued)

(52) U.S. Cl.
CPC ..... H04N 21/4788 (2013.01); H04N 21/2187 (2013.01); H04N 21/4312 (2013.01); H04N 21/4758 (2013.01)

(58) Field of Classification Search
CPC ........... H04N 21/4788; H04N 21/2187; H04N 21/4312; H04N 21/4758
See application file for complete search history.

(56) References Cited

U.S. PATENT DOCUMENTS 11,055,305 B1 *　7/2021　Petricek ................ G06F 16/252
11,115,720 B2 *　9/2021　Kedenburg, III .. H04N 21/4788
(Continued)

FOREIGN PATENT DOCUMENTS

CN　　104657346 A　　5/2015
CN　　106878819 A　　6/2017
(Continued)

OTHER PUBLICATIONS

International Search Report for PCT/CN2021/107002, dated Oct. 20, 2021.
Written Opinion for PCT/CN2021/107002, dated Oct. 20, 2021.

*Primary Examiner* — Jason K Lin
(74) *Attorney, Agent, or Firm* — Sughrue Mion, PLLC

(57)　　　　　ABSTRACT

A method, an apparatus, an electronic device, and a computer-readable storage medium for processing live streaming information. The method includes: presenting at least one question of a live streaming and an answering function entry corresponding to the at least one question; each question being obtained by aggregating questions asked by at least two viewers in a live streaming room of a host; presenting, in response to an answering operation for a target question triggered based on the answering function entry, a receiving process of corresponding answer information; and transmitting, in response to an answering completion instruction for the target question, the received answer information of the target question to a viewer end.

20 Claims, 26 Drawing Sheets

(51) Int. Cl.
    *H04N 21/431*     (2011.01)
    *H04N 21/475*     (2011.01)

(56)             References Cited

U.S. PATENT DOCUMENTS

| | | | |
|---|---|---|---|
| 2005/0108094 A1 | 5/2005 | Hugron et al. | |
| 2010/0199294 A1* | 8/2010 | Choi | H04N 21/4758 |
| | | | 725/13 |
| 2012/0159331 A1* | 6/2012 | Greve | H04N 21/4782 |
| | | | 715/730 |
| 2014/0372908 A1* | 12/2014 | Kashi | H04L 65/1089 |
| | | | 715/753 |
| 2016/0267285 A1* | 9/2016 | Ruben | G06F 21/6245 |
| 2018/0041783 A1* | 2/2018 | Xu | H04N 21/23406 |
| 2018/0255114 A1* | 9/2018 | Dharmaji | G06F 16/435 |
| 2020/0160740 A1* | 5/2020 | Nedivi | G09B 7/00 |
| 2020/0275161 A1* | 8/2020 | Yan | H04N 21/47217 |

FOREIGN PATENT DOCUMENTS

| | | |
|---|---|---|
| CN | 110020171 A | 7/2019 |
| CN | 112073741 A | 12/2020 |

* cited by examiner

A1-Host end-Mark explanation A2-Viewer end-Watch explanation A3-Viewer end-Watch explanation
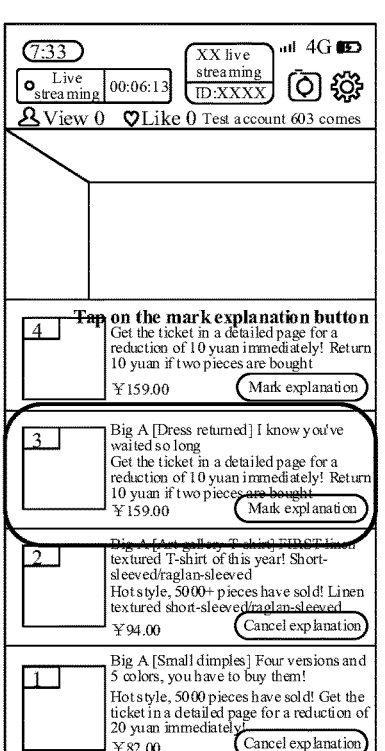
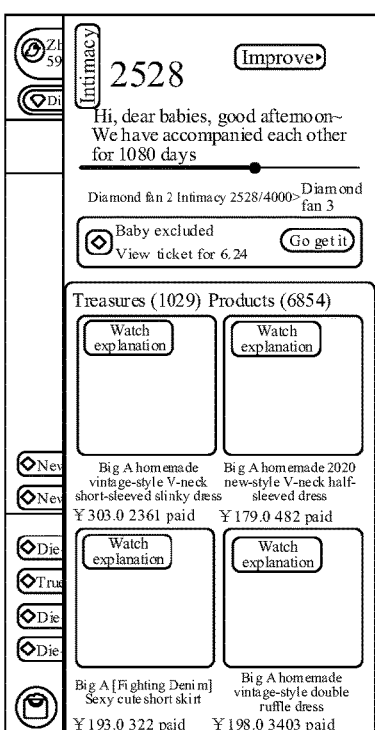
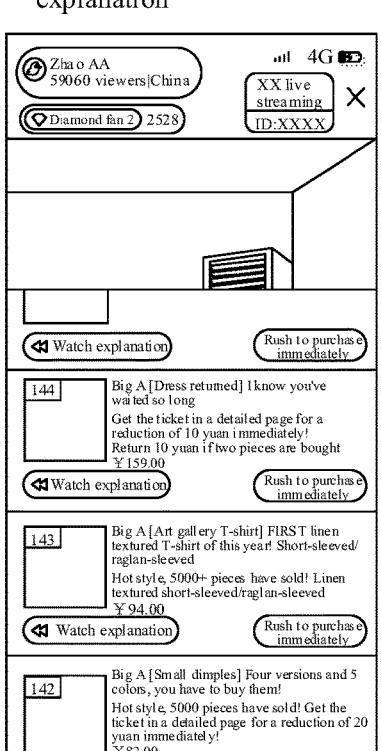
FIG. 1B Live streaming interface of a host Live streaming interface of a host

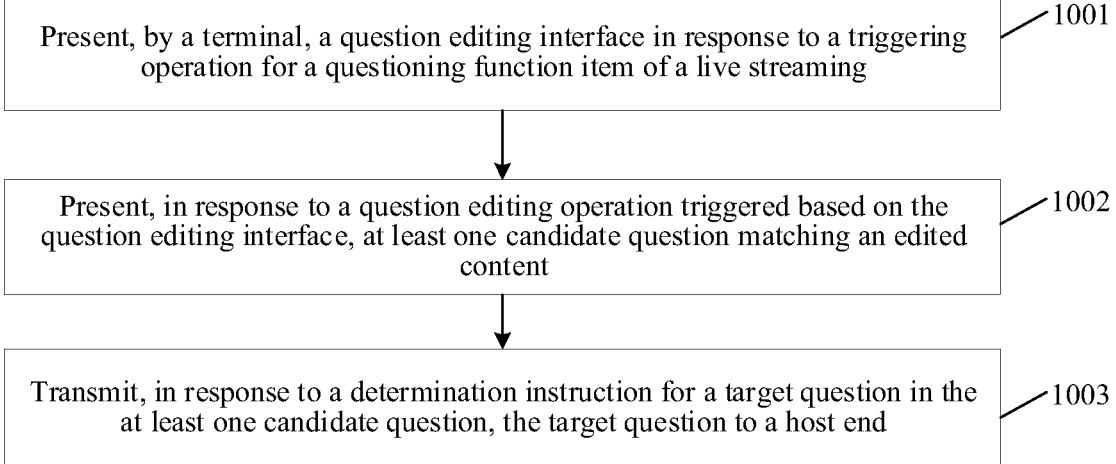

| Present, by a terminal, a question editing interface in response to a triggering operation for a questioning function item of a live streaming | 1001 |

↓

| Present, in response to a question editing operation triggered based on the question editing interface, at least one candidate question matching an edited content | 1002 |

↓

| Transmit, in response to a determination instruction for a target question in the at least one candidate question, the target question to a host end | 1003 |

FIG. 10

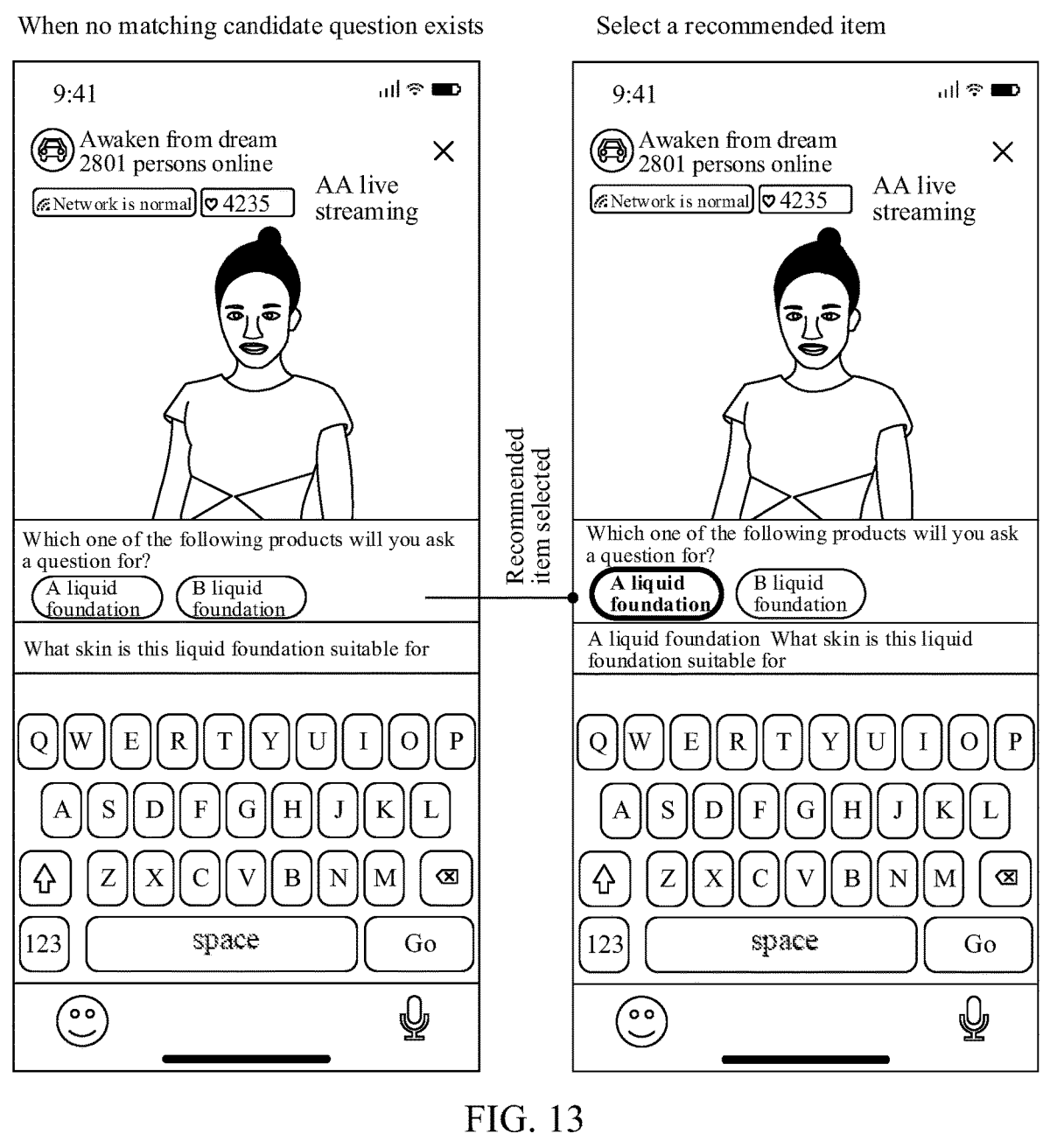

When no matching candidate question exists

Select a recommended item

9:41

Awaken from dream
2801 persons online
Network is normal  ♡ 4235
AA live
streaming

×

Which one of the following products will you ask a question for?

A liquid foundation    B liquid foundation

What skin is this liquid foundation suitable for

Q W E R T Y U I O P
A S D F G H J K L
⇧ Z X C V B N M ⌫
123    space    Go

Recommended item selected

9:41

Awaken from dream
2801 persons online
Network is normal  ♡ 4235
AA live
streaming

×

Which one of the following products will you ask a question for?

A liquid foundation    B liquid foundation

A liquid foundation  What skin is this liquid foundation suitable for

Q W E R T Y U I O P
A S D F G H J K L
⇧ Z X C V B N M ⌫
123    space    Go

FIG. 13

METHOD, APPARATUS, ELECTRONIC DEVICE, AND STORAGE MEDIUM FOR PROCESSING LIVE STREAMING INFORMATION

CROSS-REFERENCE TO RELATED APPLICATION(S)

This application is a continuation application of International Application No. PCT/CN2021/107002 filed on Jul. 19, 2021, which claims priority to Chinese Patent Application No. 202010894864.8 filed with the China National Intellectual Property Administration on Aug. 31, 2020, the disclosures of which are incorporated by reference in their entireties.

FIELD

The present disclosure relates to the field of artificial intelligence and Internet technologies, and in particular, to a method, an apparatus, an electronic device, and a computer-readable storage medium for processing live streaming information.

BACKGROUND

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

With the continuous development of artificial intelligence technologies, the artificial intelligence has been increasingly applied to the network live streaming industry. In a complete live streaming, for a host, the live streaming is continuous, and for a viewer, the live streaming is intermittent and fragmented. Therefore, there is a problem in information transfer between the host and the viewer. One host or two hosts may have to face questions raised by hundreds or thousands of viewers during the live streaming. The scattering of the questions and the asymmetry of host resources make the host unable to ensure that every viewer can obtain wanted information, which leads to a low inefficiency of answering questions during the live streaming and a low inefficiency of information transfer between the host and the viewers.

SUMMARY

Embodiments of the disclosure provide a method, an apparatus, an electronic device, and a computer-readable storage medium for processing live streaming information, which can reduce phenomena of missed or repeated answers, and improve the efficiency of answering questions by a host end and the efficiency of information transfer between the host end and a viewer end.

According to an aspect of the embodiments of the disclosure, a method for processing live streaming information is provided, the method being performed by a terminal and including: presenting at least one question of a live streaming and an answering function entry corresponding to the at least one question; each question being obtained by aggregating questions asked by at least two viewers in a live streaming room of a host; presenting, in response to an answering operation for a target question triggered based on the answering function entry, a receiving process of corresponding answer information; and transmitting, in response to an answering completion instruction for the target question, the received answer information of the target question to a viewer end.

According to an aspect of the embodiments of the disclosure, a method for processing live streaming information may be provided, the method being performed by a terminal and including: presenting a question editing interface in response to a triggering operation for a questioning function item of a live streaming; presenting, in response to a question editing operation triggered based on the question editing interface, at least one candidate question matching an edited content, the candidate question being a historical question asked by at least one viewer in a live streaming room of a host; and transmitting, in response to a determination instruction for a target question in the at least one candidate question, the target question to a host end; the target question being used for aggregately displaying the target question and the candidate question matching the target question in a case that the host end receives the target question.

According to an aspect of the embodiments of the disclosure, an apparatus for processing live streaming information may be provided, including: a first presentation module configured to present at least one question of a live streaming and an answering function entry corresponding to the at least one question; each question being obtained by aggregating questions asked by at least two viewers in a live streaming room of a host; a second presentation module configured to present, in response to an answering operation for a target question triggered based on the answering function entry, a receiving process of corresponding answer information; and a first transmission module configured to transmit, in response to an answering completion instruction for the target question, the received answer information of the target question to a viewer end.

According to an aspect of the embodiments of the disclosure, an apparatus for processing live streaming information may be provided, including: a third presentation module configured to present a question editing interface in response to a triggering operation for a questioning function item of a live streaming; a fourth presentation module configured to present, in response to a question editing operation triggered based on the question editing interface, at least one candidate question matching an edited content, the candidate question being a historical question asked by at least one viewer in a live streaming room of a host; and a second transmission module configured to transmit, in response to a determination instruction for a target question in the at least one candidate question, the target question to a host end; the target question being used for aggregately displaying the target question and the candidate question matching the target question in a case that the host end receives the target question.

According to an aspect of the embodiments of the disclosure, an electronic device may be provided, including: a memory, configured to store executable instructions; and a processor configured to implement, when executing the executable instructions stored in the memory, the method for processing live streaming information according to some embodiments.

According to an aspect of the embodiments of the disclosure, a non-transitory computer-readable storage medium storing executable instructions may be provided, and the executable instructions, when executed by a processor, implement the method for processing live streaming information according to the embodiments.

When the method, apparatus, electronic device, and computer-readable storage medium for processing live streaming information provided by the embodiments of the disclosure are applied, by presenting an answering function entry corresponding to at least one question, when an answering operation for a target question triggered based on the answering function entry is received, a receiving process of corresponding answer information is represented, and when an answering completion instruction for the target question is received, the answer information of the target question is sent to a viewer end. Every question presented is obtained by aggregating questions asked by at least two viewers in a live streaming room. In this way, it is unnecessary to present all the questions raised by the viewers, that is, to avoid repeated display of the same question, so that a host can pay attention to more other different questions, thereby reducing phenomena of missed answers and repeated answers, and improving the efficiency of answering questions by a host end and the efficiency of information transfer between the host end and the viewer end.

It is to be understood that, the foregoing general descriptions and the following detailed descriptions are merely for illustration and explanation purposes and are not intended to limit the disclosure.

BRIEF DESCRIPTION OF THE DRAWINGS

Accompanying drawings herein are incorporated into a specification and constitute a part of this specification, show embodiments that conform to the disclosure, and are used for describing a principle of the disclosure together with this specification. The accompanying drawings in the following descriptions are merely some embodiments of the disclosure, and a person of ordinary skill in the art may further obtain other accompanying drawings according to the accompanying drawings without creative efforts. In addition, one of ordinary skill would understand that aspects of example embodiments may be combined together or implemented alone. In the accompanying drawings:

FIG. 1B is a second schematic diagram of a method for processing live streaming information according to the related art.

FIG. 10 is a schematic flowchart of a method for processing live streaming information according to some embodiments.

FIG. 13 is a schematic flowchart of selecting a recommended item according to some embodiments.

DESCRIPTION OF EMBODIMENTS

Figure 1A:
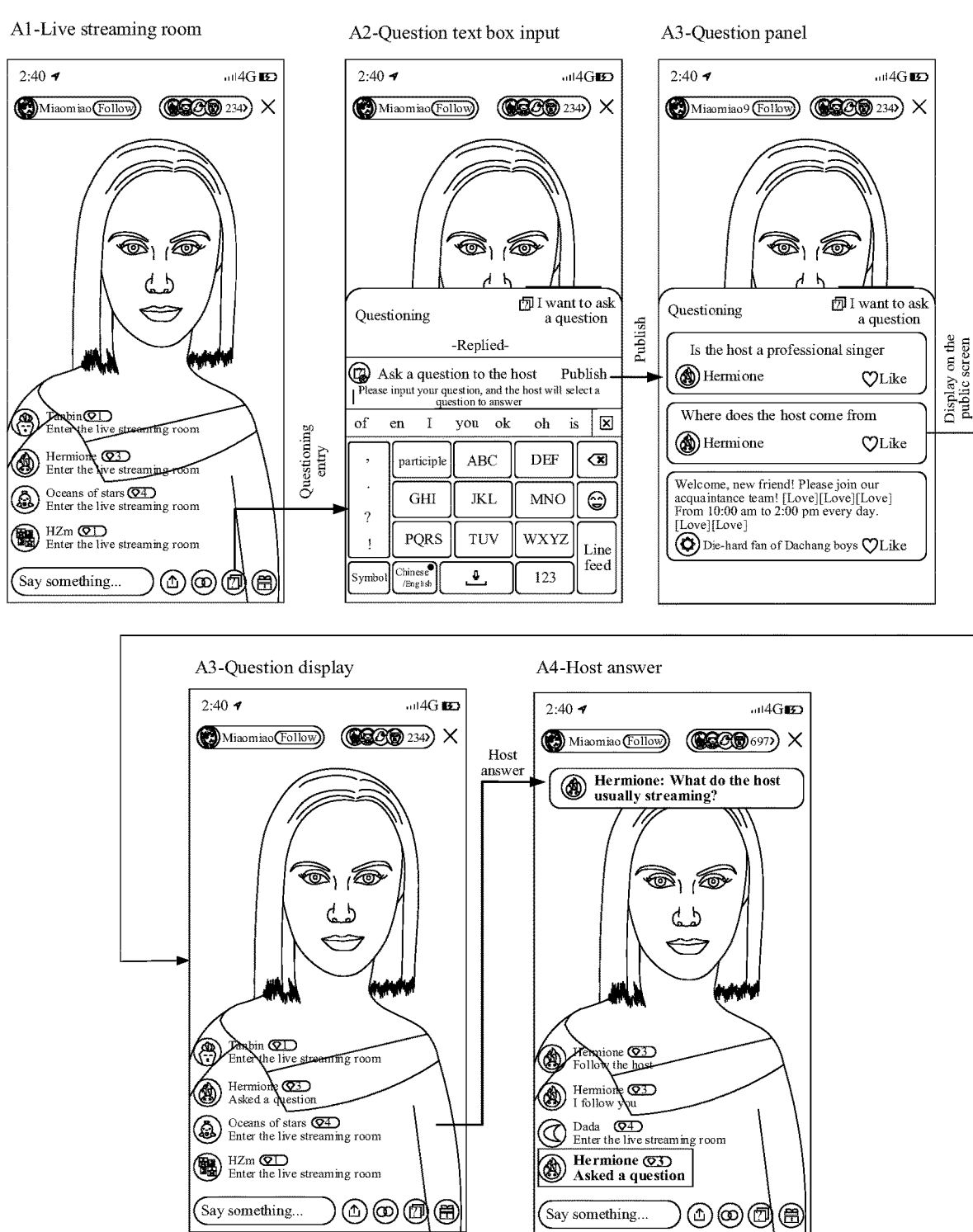
FIG. 1A is a first schematic diagram of a method for processing live streaming information according to the related art.

To make the objectives, technical solutions, and advantages of the embodiments of the disclosure clearer, the following describes the embodiments in further detail with reference to the accompanying drawings. The described embodiments are not to be considered as a limitation to the disclosure. All other embodiments obtained by a person of ordinary skill in the art without creative efforts shall fall within the protection scope.

The term "some embodiments" describes subsets of all possible embodiments, but it may be understood that "some embodiments" may be the same subset or different subsets of all the possible embodiments, and can be combined with each other without conflict.

The included term "first/second/third" is merely intended to distinguish similar objects but does not necessarily indicate a specific order of an object. It may be understood that "first/second/third" is interchangeable in terms of a specific order or sequence if permitted, so that the embodiments described herein can be implemented in a sequence in addition to the sequence shown or described herein.

Unless otherwise defined, meanings of all technical and scientific terms used in this specification are the same as those usually understood by a person skilled in the art. The terms used are merely intended to describe objectives of the embodiments, but are not intended to limit the disclosure.

Before the embodiments of the disclosure are further described in detail, a description is made on nouns and terms in the embodiments, and the nouns and terms in the embodiments are applicable to the following explanations.

1) "In response to" is used for representing a condition or status on which one or more operations to be performed depend. When the condition or status is satisfied, the one or more operations may be performed immediately or after a set delay. Unless explicitly stated, there is no limitation on the order in which the plurality of operations are performed.

2) Live streaming refers to an information network publishing method having a two-way flow process in which information is produced and published synchronously with the occurrence and development of an event.

3) Host refers to a person in charge of a live streaming through a live streaming platform.

4) Natural language processing (NLP) is an important direction in the fields of computer science and artificial intelligence, and studies various theories and methods that can realize effective communication between humans and computers using a natural language. NLP is a science that integrates linguistics, computer science, and mathematics. The NLP technology generally includes technologies such as text processing, semantic understanding, machine translation, robot question and answer, and knowledge graph.

In a complete live streaming, for a host, the live streaming is continuous, and for a viewer, the live streaming is intermittent and fragmented. This leads to a time difference between the host and the viewer in the same space, and information transfer may be failed. One host or two hosts may have to face questions raised by hundreds or thousands of viewers. The scattering of the questions and the asymmetry of host resources make some viewers unable to acquire intended information.

FIG. 1A and FIG. 1B are schematic diagrams of a method for processing live streaming information according to the related art. In the related art, questions are usually highlighted by a host end using special signs. For example, an existing knowledge-based live streaming product will provide a question-asking entry for users to ask questions manually, and a host can see, through the presented question-asking entry, the questions raised by a viewer end and answer the questions, as shown in FIG. 1A.

Alternatively, a commodity explanation during a live streaming is segmented into clips for playback (such as in many e-commerce live streaming software), and in order to maximize the use of live streaming resources of the commodity explanation, segmented recording of the live streaming is edited in an interactive method of marking the explanation, and by manually editing the recording, a viewer can see a playback content clip of each commodity explanation at any time, as shown in FIG. 1B.

However, the solution of highlighting questions through special signs can only solve some live streaming scenarios. When the quantity of questions asked is too large, the questions still cannot be well displayed. The questions asked by viewers are all displayed on a public screen of the live streaming, and the questions asked are formal and binding, which cannot meet requirements of the viewers of asking any relevant questions anytime and anywhere. The solution of segmenting the live streaming commodity explanation into clips for playback solves the pain point that in a scenario of the commodity explanation, questions raised by viewers are ignored in a case of a large quantity of online users.

Based on this, embodiments of the disclosure provide a method, an apparatus, an electronic device, and a computer-readable storage medium for processing live streaming information, so as to at least solve the above problems, which will be described below.

Figure 2:
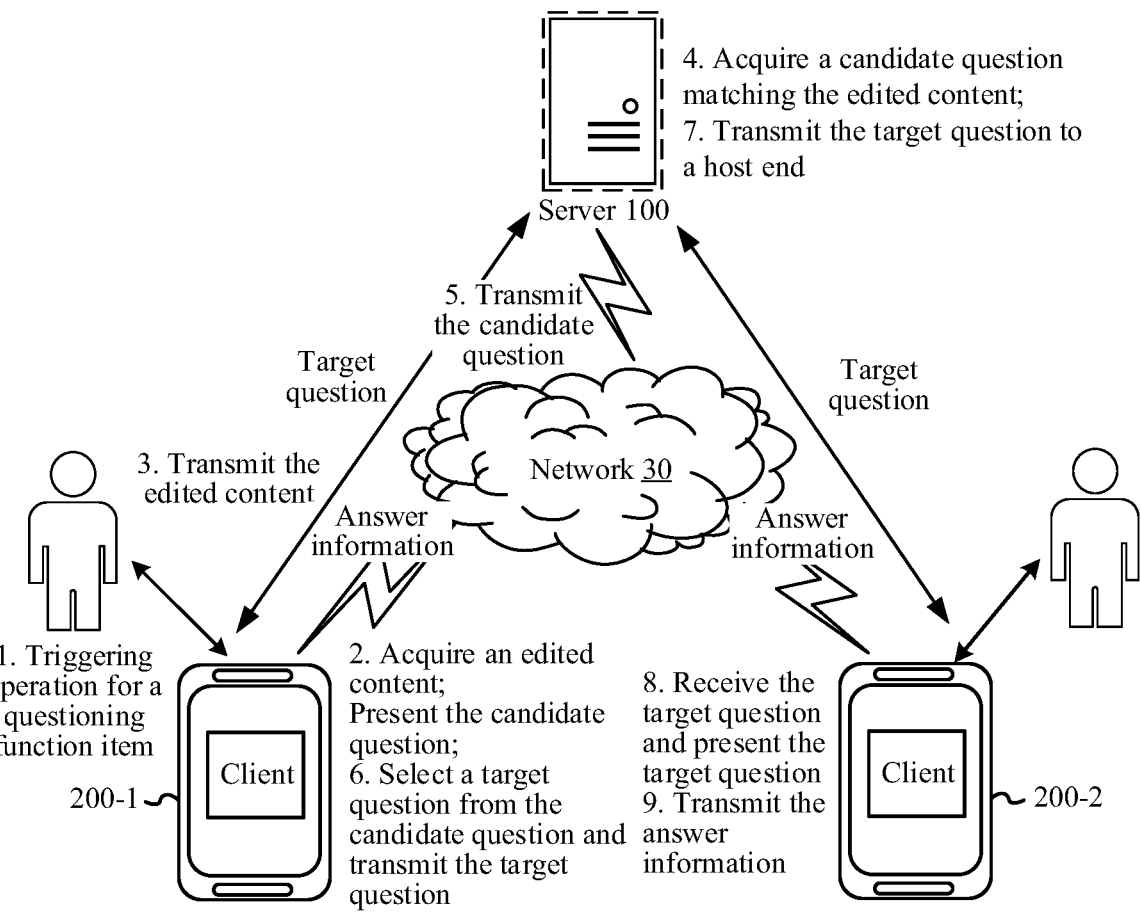
FIG. 2 is a schematic diagram of an implementation scenario of a method for processing live streaming information according to some embodiments.

Based on the above explanations of nouns and terms involved in the embodiments, an implementation scenario of the method for processing live streaming information according to an embodiment of the disclosure is illustrated below first. FIG. 2 is a schematic diagram of an implementation scenario of a method for processing live streaming information according to an embodiment. In order to support an exemplary application, terminals (including a terminal 200-1 and a terminal 200-2) are connected to a server 100 through a network 30. The terminal 200-1 is located at a viewer end, and the terminal 200-2 is located at a host end. The quantity of terminals on the viewer end and the quantity of terminals on the host end may both be one or more. The network 30 may be a wide area network or a local area network, or a combination of the two, and implement data transmission using a wireless or wired link.

The terminal 200-1 is configured to present a question editing interface in response to a triggering operation for a questioning function item of a live streaming; and acquire, in response to a question editing operation triggered based on the question editing interface, a content edited based on the question editing operation and transmit the content to the server 100.

The server 100 is configured to receive the content edited based on the question editing operation and transmitted by the terminal 200-1; and acquire at least one candidate question matching the edited content, and return the candidate question to the terminal 200-1.

The terminal 200-1 is further configured to receive the at least one candidate question returned by the server 100 and matching the edited content and present the candidate question; and transmit a target question to the server 100 in response to a determination instruction for the target question in the at least one candidate question.

The server 100 is configured to receive the target question transmitted by the terminal 200-1, and transmit the target question to the terminal 200-2 on the host end.

The terminal 200-2 is configured to receive the target question transmitted by the server 100, present at least one question including the target question and an answering function entry corresponding to the at least one question; present, in response to an answering operation for the target question triggered based on the answering function entry, a receiving process of corresponding answer information; and transmit, in response to an answering completion instruction for the target question, the received answer information of the target question to the terminal 200-1.

The terminal 200-1 is further configured to receive and output the answer information of the target question transmitted by the terminal 200-2.

The server 100 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, or a smartwatch, but is not limited thereto. The terminal and the server may be directly or indirectly connected in a wired or wireless communication manner. However, this is not limited herein.

Figure 3:
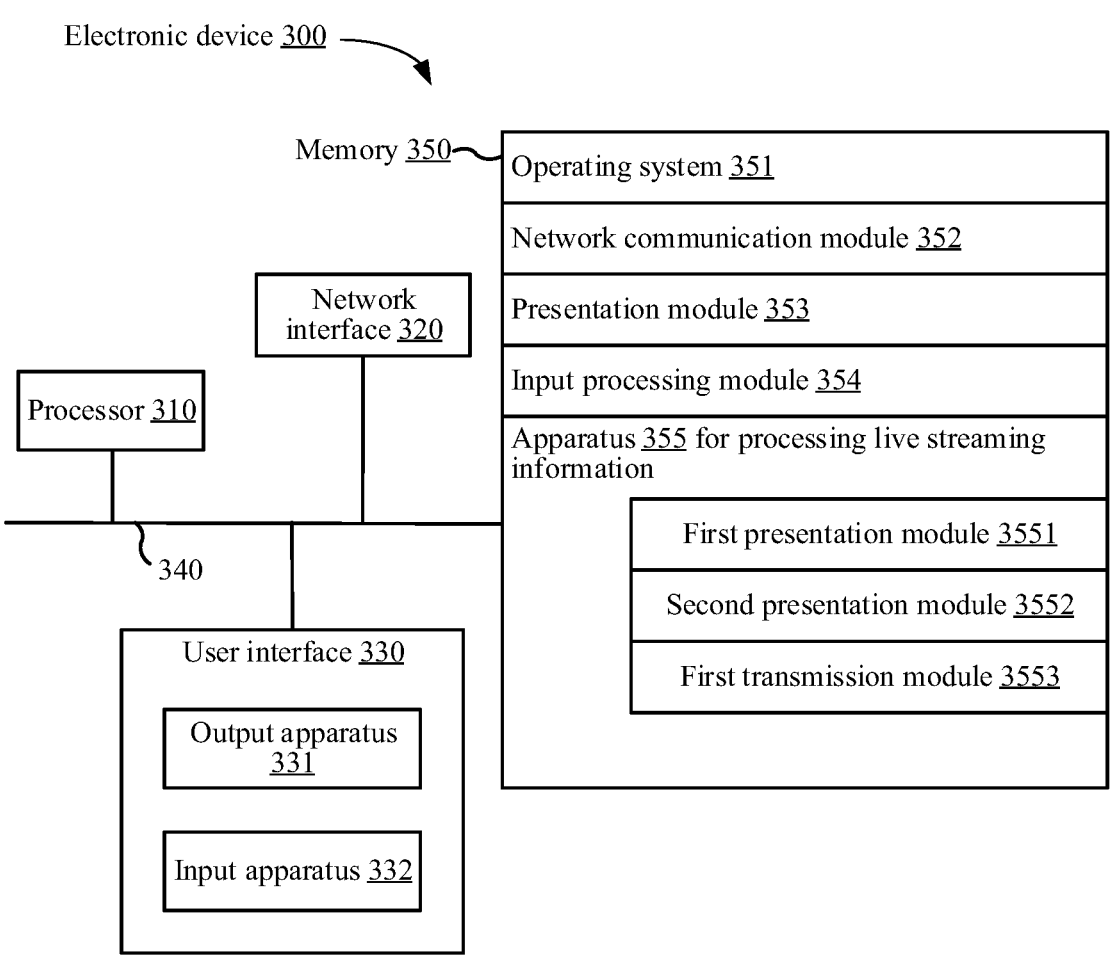
FIG. 3 is a schematic structural diagram of an electronic device according to some embodiments.

A hardware structure of an electronic device implementing the method for processing live streaming information according to some embodiments will be described in detail below. The electronic device includes but is not limited to a server or a terminal. FIG. 3 is a schematic structural diagram of an electronic device according to some embodiments. The electronic device 300 shown in FIG. 3 includes at least one processor 310, a memory 350, at least one network interface 320, and a user interface 330. All the components in the electronic device 300 are coupled together by using a bus system 340. It may be understood that the bus system 340 is configured to implement connection and communication between the components. In addition to a data bus, the bus system 340 further includes a power bus, a control bus, and a status signal bus. However, for ease of clear description, all types of buses are marked as the bus system 340 in FIG. 3.

The processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, or any conventional processor.

The user interface 330 includes one or a plurality of output apparatuses 331 that enable presentation of media content, including one or a plurality of speakers and/or one or a plurality of visual display screens. The user interface 330 further includes one or a plurality of input apparatuses 332, including a user interface component that facilitates user input, such as a keyboard, a mouse, a microphone, a touchscreen display, a camera, and other input buttons and controls.

The memory 350 may be removable, non-removable, or a combination thereof. An exemplary hardware device includes a solid state memory, a hard drive, an optical drive, and the like. The memory 350 optionally includes one or a plurality of storage devices that are physically remote from the processor 310.

The memory 350 includes a volatile memory or a non-volatile memory, or may include a volatile memory and a non-volatile memory. The non-volatile memory may be a Read Only Memory (ROM), and the volatile memory may be a Random Access Memory (RAM). The memory 350 described in some embodiments is to include any other suitable type of memories.

In some embodiments, the memory 350 is capable of storing data to support various operations, and an example of the data includes a program, a module, and a data structure, or a subset or superset thereof, as exemplified below.

An operating system 351 includes a system program configured to process various basic system services and perform a hardware-related task, for example, a framework layer, a core library layer, and a driver layer, and is configured to implement various basic services and process a hardware-related task.

A network communication module 352 is configured to reach another computing device through one or more (wired or wireless) network interfaces 320. Exemplary network interfaces 320 include: Bluetooth, wireless compatible authentication (WiFi), and a universal serial bus (USB).

A display module 353 is configured to display information by using an output apparatus 331 (for example, a display screen or a speaker) associated with one or more user interfaces 330 (for example, a user interface configured to operate a peripheral device and display content and information).

An input processing module 354 is configured to detect one or more user inputs or interactions from one of the one or more input apparatuses 332 and translate the detected input or interaction.

In some embodiments, the apparatus for processing live streaming information may be implemented by software. FIG. 3 shows an apparatus 355 for processing live streaming information stored in the memory 350, which may be software in the form of a program, a plug-in, and the like, and include the following software modules, or code, including a first presentation module 3551, a second presentation module 3552, and a first transmission module 3553. The modules, or code, are logical, and therefore can be combined in different manners or further split according to functions implemented, and the functions will be illustrated below.

In other embodiments, the apparatus for processing live streaming information may be implemented by a combination of software and hardware. For example, the apparatus for processing live streaming information according to the embodiments may be a processor in the form of a hardware decoding processor, and the processor is programmed to perform the method for processing live streaming information according to some embodiments. For example, the processor in the form of a hardware decoding processor may adopt one or a plurality of Application Specific Integrated Circuits (ASICs), DSPs, Programmable Logic Devices (PLDs), Complex Programmable Logic Devices (CPLDs), Field-Programmable Gate Arrays (FPGAs), or other electronic components.

Figure 4:
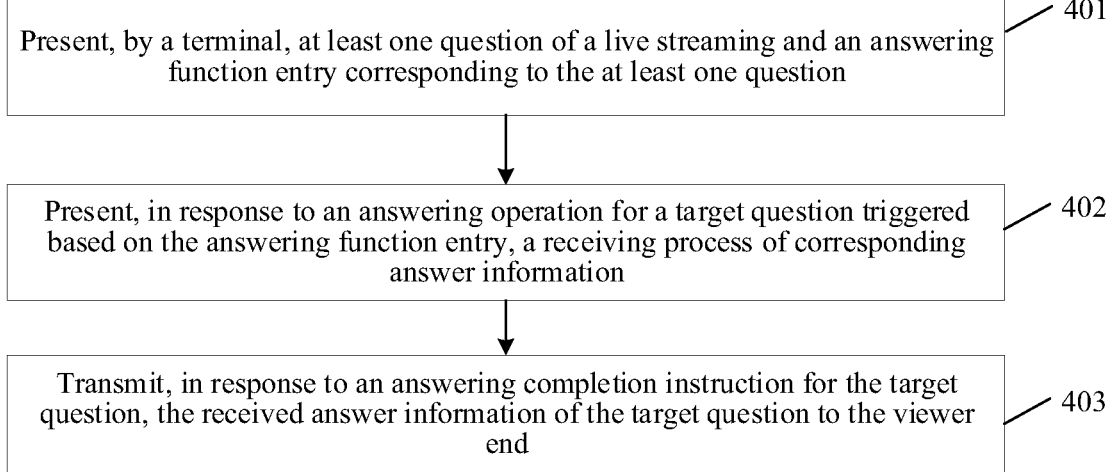
FIG. 4 is a schematic flowchart of a method for processing live streaming information according to some embodiments.

Based on the above description of the implementation scenario of the method for processing live streaming information and the electronic device according to the embodiments, the method for processing live streaming information according to some embodiments is described below. FIG. 4 shows a schematic flowchart of a method for processing live streaming information according to an embodiment of the disclosure. In some embodiments, the method for processing live streaming information may be implemented by a server or a terminal alone, or implemented by a server and a terminal collaboratively. Taking the terminal implementation as an example, the method for processing live streaming information according to an example embodiment includes the following operations:

Operation 401: Present, by a terminal, at least one question of a live streaming and an answering function entry corresponding to the at least one question.

Each presented question of the live streaming is obtained by aggregating questions asked by at least two viewers in a live streaming room of a host. The question is initiated by a viewer end to ask questions and consult about items recommended by the host in the live streaming room (such as beauty products, clothes, and electronic products), such as "what skin type is XX liquid foundation suitable for" and "what age is this shirt suitable for." When aggregating questions asked by at least two viewers, aggregation may be performed according to semantics of different questions. For example, semantics corresponding to two questions is "asking what skin type is XX liquid foundation suitable for," and then the two questions can be aggregated to obtain a question "what skin type is XX liquid foundation suitable for."

In an example embodiments, the terminal is provided with an application client with a live streaming function, such as a live streaming client and an instant messaging client. A host end may perform live streaming through the terminal provided with the application client, and transmit a live streaming content to a back-end server in real time. The back-end server forwards the content to the viewer end, so that the viewer end can watch the live streaming through the arranged application client. In an example embodiment, after a host enters a live streaming room and starts a live streaming, a terminal collects video pictures of the host in real time through an image acquisition device, presents a live streaming content corresponding to a host user through a live streaming interface of the host end, and transmits the live streaming content to a back-end server in real time. After acquiring the live streaming content corresponding to the host user presented by the host end in the live streaming interface, the server forwards the live streaming content of the host end to the viewer end, so as to realize synchronization of the live streaming content between the host end and the viewer end, and realize information interaction between the host end and the viewer end.

When the terminal of the host end receives at least one question transmitted by the viewer end, the at least one question is presented, and an answering function entry corresponding to the at least one question is presented. The host may answer the question by tapping on the answering function entry to perform an answering process of the corresponding question.

In some embodiments, the terminal may present at least one question of the live streaming and the answering function entry corresponding to the at least one question in the following manner: presenting, in the live streaming interface of the host, at least one question and the answering function entry corresponding to each question in the form a barrage.

Figure 5A:
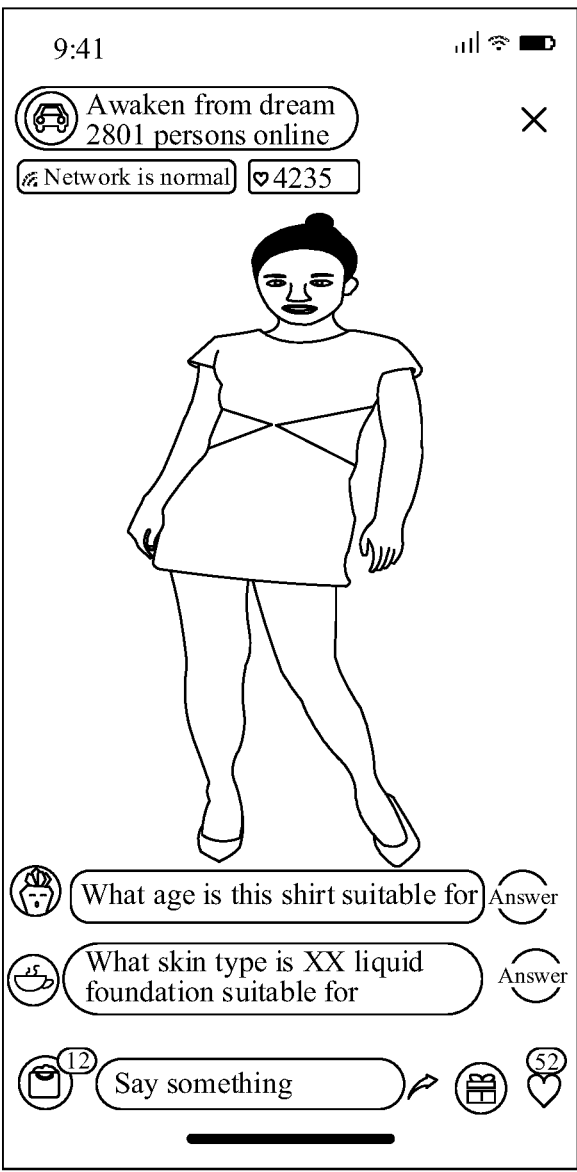
FIG. 5A is a first schematic diagram of presenting a question and a corresponding answering function entry according to some embodiments.

FIG. 5A shows a first schematic diagram of presenting a question and a corresponding answering function entry according to some embodiments. In the live streaming interface of the host, questions asked by viewers are presented in the form of barrages, including "what skin type is XX liquid foundation suitable for" and "what age is this shirt suitable for," and a corresponding answering function entry "Answer" for each question is presented. When there are many questions, the method of barrage scrolling may be used for presentation, such as scrolling from left to right or scrolling from top to bottom. The host may answer the corresponding question by tapping on the presented answering function entry "Answer".

In some embodiments, the terminal may also present at least one question of the live streaming and the answering function entry corresponding to the at least one question in the following manner: presenting a question answering function entry in the live streaming interface of the host; and presenting, in response to a triggering operation for the question answering function entry, at least one question and an answering function entry corresponding to each question.

In some embodiments, the terminal may present the question answering function entry in the live streaming interface of the host in the following manner: presenting, in the live streaming interface of the host, a floating button used as the question answering function entry. Correspondingly, the terminal may present at least one question and the answering function entry corresponding to each question in the following manner: presenting a question answering interface in response to a triggering operation for the floating button; and presenting, in the question answering interface, at least one question and the answering function entry corresponding to each question.

In order to make a page on the host end clearer and more orderly, the question may not be directly presented in the live streaming interface. At this time, the terminal may present the question answering function entry on the live streaming interface of the host. In an actual implementation, the question answering function entry may be presented in the live streaming interface of the host in the manner of a floating button. When a triggering operation for the question answering function entry is received, the at least one question and the answering function entry corresponding to each question are presented.

Figure 5B:
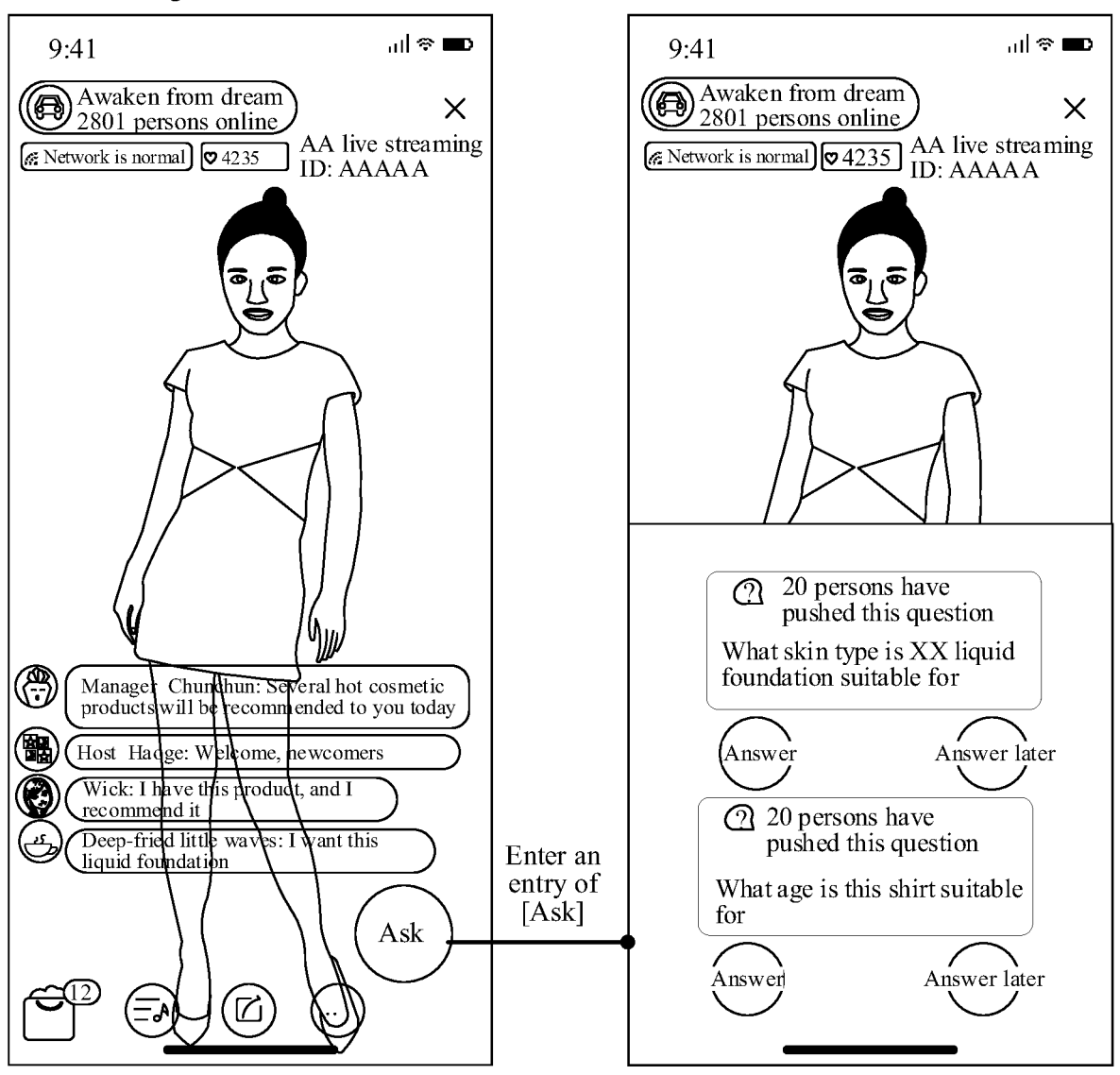
FIG. 5B is a second schematic diagram of presenting a question and a corresponding answering function entry according to some embodiments.

FIG. 5B shows a second schematic diagram of presenting a question and a corresponding answering function entry according to some embodiments. As shown in FIG. 5B, in the live streaming interface of the host, the question answering function entry is presented in the manner of a floating button "Ask." A triggering operation for the question answering function entry "Ask" is received, a question such as "what skin type is XX liquid foundation suitable for" and "what age is this shirt suitable for" is presented, and a corresponding answering function entry "Answer" is presented.

In some embodiments, the terminal may also present at least one question of the live streaming and the answering function entry corresponding to the at least one question in the following manner: presenting a card floating layer corresponding to each question in a stacked manner, and presenting, in the card floating layer corresponding to each question, an answering function entry for the corresponding question.

Figure 5C:
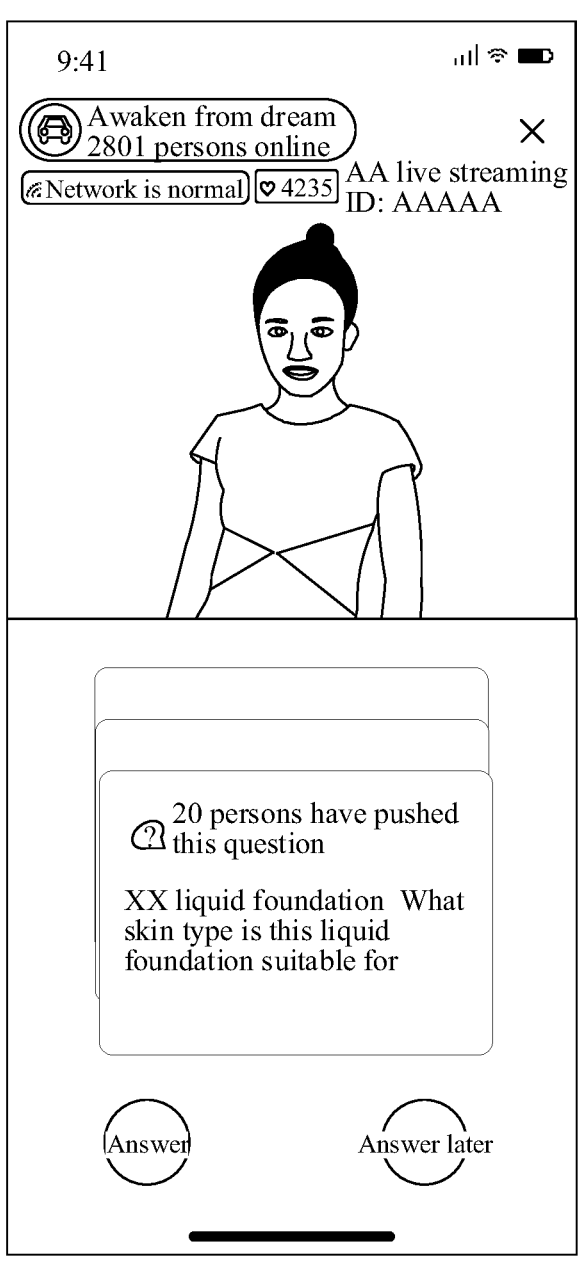
FIG. 5C is a third schematic diagram of presenting a question and a corresponding answering function entry according to some embodiments.

FIG. 5C shows a third schematic diagram of presenting a question and a corresponding answering function entry according to some embodiments. The terminal presents the card floating layer corresponding to each question in a stacked manner, and the corresponding question and the answering function entry "Answer" corresponding to the question are presented in the card floating layer.

In some embodiments, the terminal may present the quantity of questions asked by viewers corresponding to each question. Correspondingly, the terminal may also present alarm information corresponding to a question of which the quantity of questions asked by viewers exceeds a threshold of the quantity of questions asked, and the alarm information is used for indicating a processing priority of the corresponding question.

Since each question is obtained by aggregating questions asked by a plurality of viewers, when the terminal presents each question, it may also present the quantity of questions asked by viewers corresponding to the question.

Correspondingly, when the quantity of questions asked by viewers corresponding to a certain question exceeds the threshold of the quantity of questions asked, it means that there are a large quantity of viewers who need to understand the question and the question needs to be processed in time. At this time, the alarm information corresponding to the question may be presented to prompt the host to give priority to answering the question.

Figure 6A:
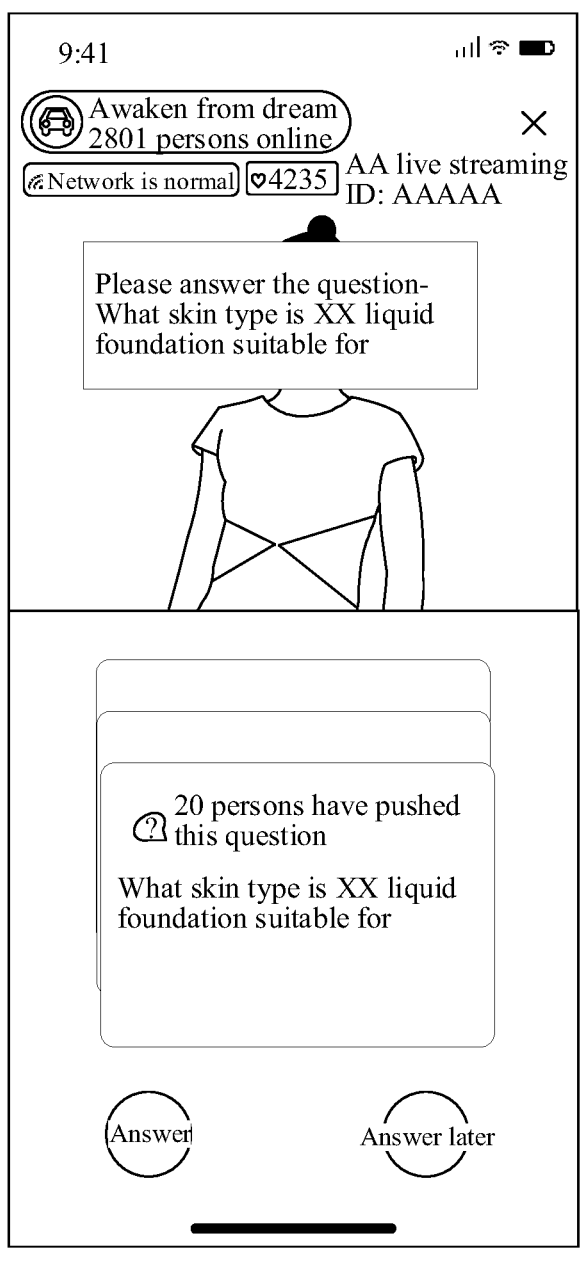
FIG. 6A is a schematic diagram of presenting alarm information according to some embodiments.

FIG. 6A shows a schematic diagram of presenting alarm information according to some embodiments. In the live streaming interface of the host, the terminal presents a question "what skin type is XX liquid foundation suitable for" asked by viewers, and presents the quantity of questions asked by viewers "20." For example, a preset threshold of the quantity of questions asked is 19. At this time, the quantity of questions asked by viewers for this question exceeds the threshold of the quantity of questions asked, and alarm information of "Please answer the question-what skin type is XX liquid foundation suitable for" will be presented in the live streaming interface of the host.

In some embodiments, the terminal may also output prompt information of the question in the following manner: acquiring a sum of the quantity of questions asked by viewers corresponding to at least one question; comparing the sum of the quantity of questions asked by viewers with at least two preset quantity thresholds respectively to obtain a comparison result; and outputting prompt information corresponding to the comparison result, the prompt information being used for prompting the degree of urgency of answering the at least one question.

At least two quantity thresholds may also be preset for the quantity of questions asked by viewers for the question, so as to reflect the degree of urgency of answering the question. Also, at least two quantity thresholds may be set for each question, or at least two quantity thresholds may be set for a sum of the quantity of questions asked by viewers corresponding to each question. When the at least two quantity thresholds are set for the sum of the quantity of questions asked by viewers corresponding to each question, the sum of the quantity of questions asked by viewers may be compared with the at least two preset quantity thresholds respectively to obtain comparison results, and according to the comparison results, prompt information corresponding to the different comparison results is output respectively, so as to prompt the host of the degree of urgency of answering the at least one question.

Figure 6B:
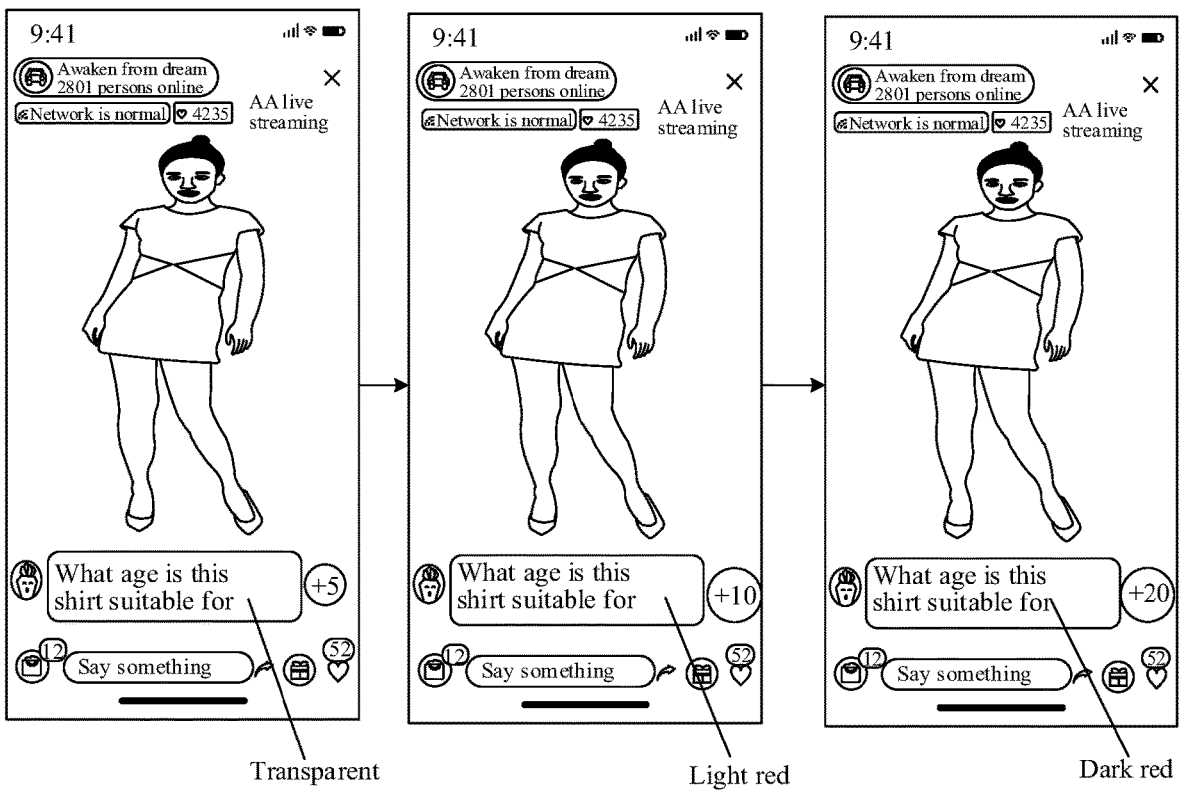
FIG. 6B is a schematic diagram of presenting prompt information according to some embodiments.

FIG. 6B shows a schematic diagram of presenting prompt information according to some embodiments. Two quantity thresholds, for example 10 and 20, are set for the sum of the quantity of questions asked by viewers corresponding to the question asked by the viewers. When the sum of the quantity of questions asked by viewers corresponding to the question does not exceed any threshold, the question is presented through a transparent barrage. When it is determined that the sum of the quantity of questions asked by viewers for the question exceeds a first threshold, for example 10, and does not exceed a second threshold, for example 20, the question is presented through a light red barrage. When it is determined that the sum of the quantity of questions asked by viewers for the question exceeds the second threshold, the question is presented through a dark red barrage. In the example, the degree of urgency of answering the question by the host is prompted by the change of color. In another example, the prompt may also be achieved by flashing, and this is not limited herein.

Operation 402: Present, in response to an answering operation for a target question triggered based on the answering function entry, a receiving process of corresponding answer information.

When the host answers the question raised by the viewer, it may be achieved by triggering an answering function entry. When receiving the answering operation for the target question triggered based on the answering function entry, the terminal presents a receiving process of the corresponding answer information in response to the answering operation.

In some embodiments, the terminal may present the receiving process of the corresponding answer information in the following manner: presenting, in response to a triggering operation for the answering function entry corresponding to the target question, a text answer input box corresponding to the target question; and sequentially presenting, along with an answering operation in a text form performed based on the text answer input box, answer information in a text form received based on the text answer input box.

Figure 7A:
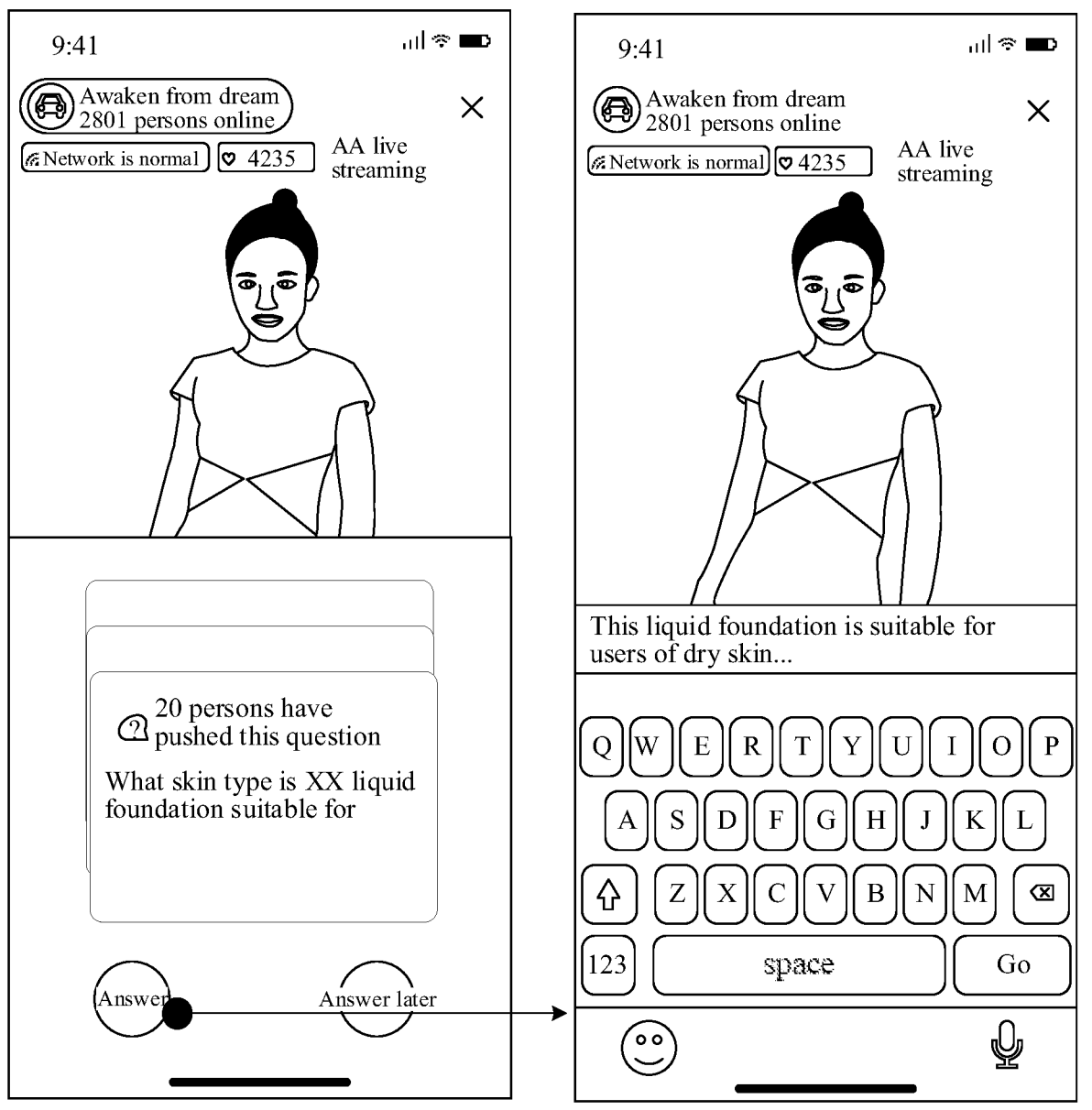
FIG. 7A is a first schematic diagram of presenting a receiving process of answer information according to some embodiments.

FIG. 7A shows a first schematic diagram of presenting a receiving process of answer information according to some embodiments. The terminal receives a triggering operation, for example, an operation such as tapping and long press, for an answering function entry "Answer" corresponding to a target question, and in response to the triggering operation, presents a text answer input box corresponding to the target question. Along with an answering operation in the text form performed based on the text answer input box, the answer information in the text form received in the text answer input box is sequentially presented, for example, "This liquid foundation is suitable for users with dry skin . . . "

In some embodiments, the terminal may also present the receiving process of the corresponding answer information in the following manner: presenting, in response to a triggering operation for the answering function entry corresponding to the target question, voice collection prompt information corresponding to the target question; and presenting, along with an answering operation in a voice form performed based on the voice collection prompt information, a changing process of a style of the voice collection prompt information. The voice collection prompt information is used for prompting that answer information in the voice form for the target question is being collected.

Figure 7B:
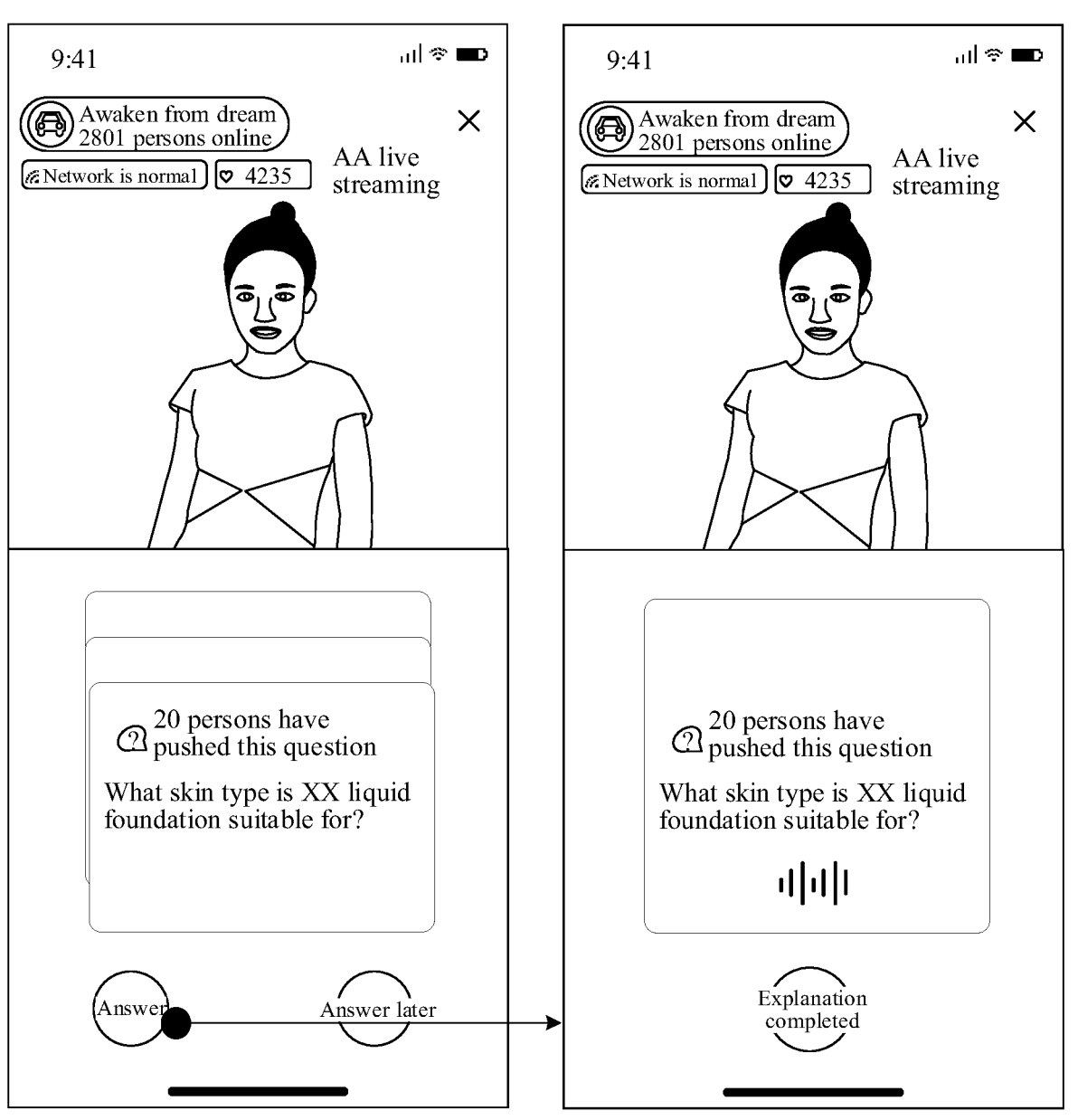
FIG. 7B is a second schematic diagram of presenting a receiving process of answer information according to some embodiments.

FIG. 7B shows a second schematic diagram of presenting a receiving process of answer information according to some embodiments. The terminal receives a triggering operation, for example, an operation such as tapping and long press, for an answering function entry corresponding to a target question, and in response to the triggering operation, presents voice collection prompt information corresponding to the target question. At the same time, while the voice collection is performed, the changing process of the style of the voice collection prompt information is also presented by, for example, beating vertical lines.

In some embodiments, the terminal presents the card floating layer corresponding to each question in a stacked manner. Correspondingly, after a question is answered, the terminal may automatically switch to the next question to be answered in the following manner: sliding out the card floating layer corresponding to the target question from the live streaming interface in response to the answering completion instruction for the target question, and presenting a card floating layer corresponding to a question adjacent to the target question.

In an example embodiment, when the terminal presents the card floating layer corresponding to each question in a stacked manner, after the answer to the question on the top-layer card is completed, the host may switch to the next question by triggering an answering completion instruction. When receiving the answering completion instruction for the target question triggered by the host, the terminal slides out the card floating layer corresponding to the target question from the live streaming interface, and simultaneously presents the card floating layer corresponding to the question adjacent to the target question.

Figure 8A:
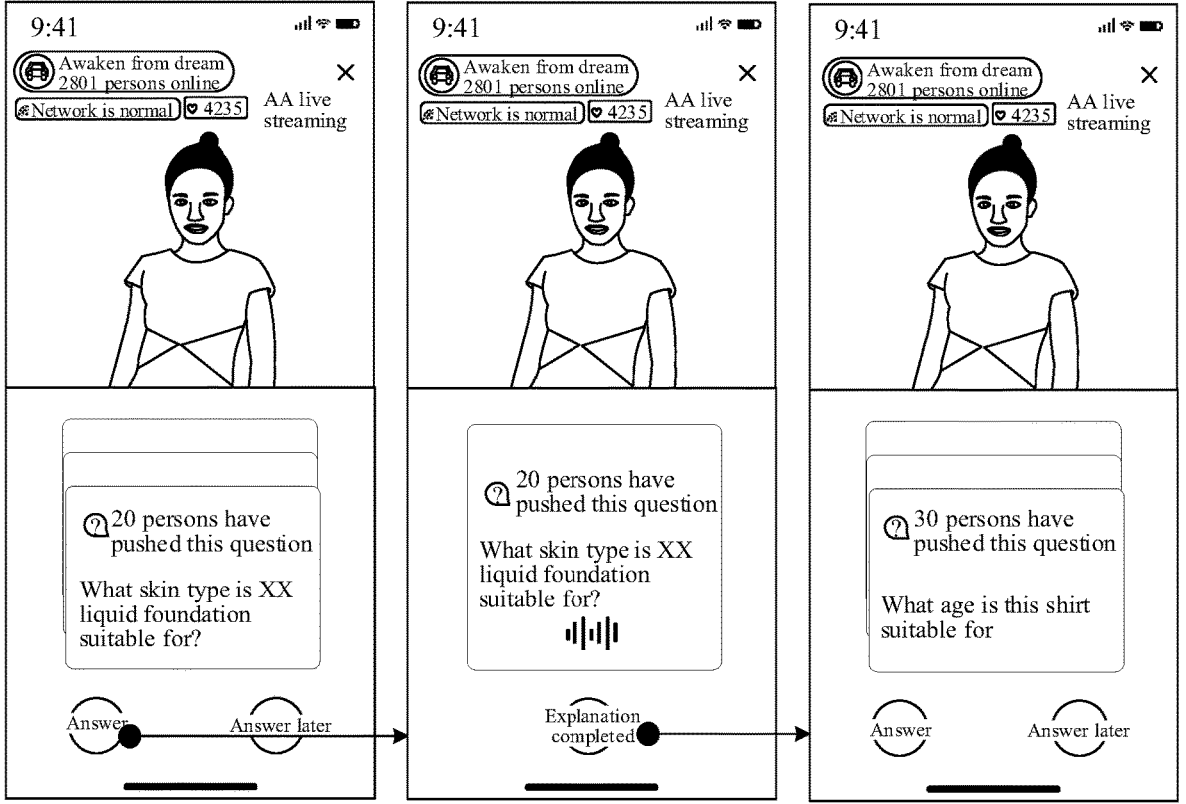
FIG. 8A is a first schematic flowchart of an answering process based on presentation of a question on a card floating layer according to some embodiments.

FIG. 8A shows a first schematic flowchart of an answering process based on presentation of a question on a card floating layer according to some embodiments. The terminal presents the question "what skin type is XX liquid foundation suitable for" through a top floating layer, and presents an answering completion function item "Explanation completed" corresponding to the question. When receiving a triggering operation for the answer completion function item "Explanation completed," that is, receiving the answering completion instruction for the question, the card floating layer of the question is slid out from the live streaming interface, such as from the left side, and a card floating layer of a question "what age is this shirt suitable for" adjacent to the question is then presented.

In some embodiments, the terminal presents the card floating layer corresponding to each question in a stacked manner. Correspondingly, the terminal may select a target question to be answered in the following way: presenting, in the card floating layer corresponding to each question, a delayed answering function item of the corresponding question. The delayed answering function item is used for sliding out the card floating layer of the corresponding question from the live streaming interface when a triggering operation for the delayed answering function item is received, and presenting a card floating layer under the slid-out card floating layer.

Figure 8B:
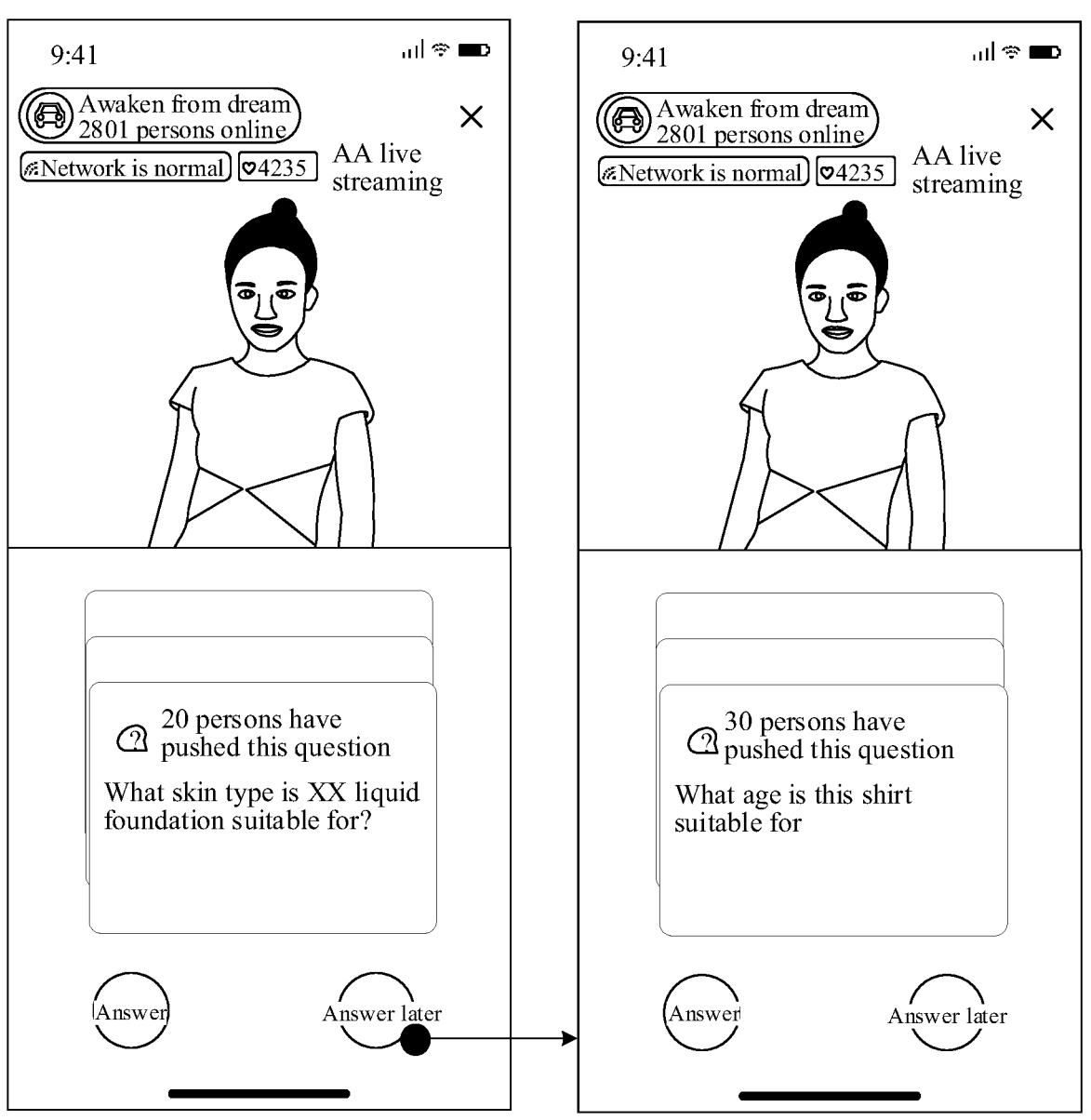
FIG. 8B is a second schematic flowchart of an answering process based on presentation of a question on a card floating layer according to some embodiments.

FIG. 8B shows a second schematic flowchart of an answering process based on presentation of a question on a card floating layer according to some embodiments. The terminal presents the question "what skin type is XX liquid foundation suitable for" through the top floating layer, and presents a delayed answering function item "Answer later" corresponding to the question. When a triggering operation for the delayed answering function item "Answer later" is received, the card floating layer of the question is slid out from the live streaming interface, for example, from the left side, and then a card floating layer under the card floating layer is presented, that is, a card floating layer of the question "what age is this shirt suitable for" is presented.

Operation 403: Transmit, in response to an answering completion instruction for the target question, the received answer information of the target question to a viewer end.

In some embodiments, the terminal may transmit the received answer information of the target question to the viewer end in the following manner: presenting an answering completion function item corresponding to the target question; and transmitting, in response to the answering completion instruction for the target question triggered based on the answering completion function item, the received answer information of the target question to the viewer end.

Figure 9:
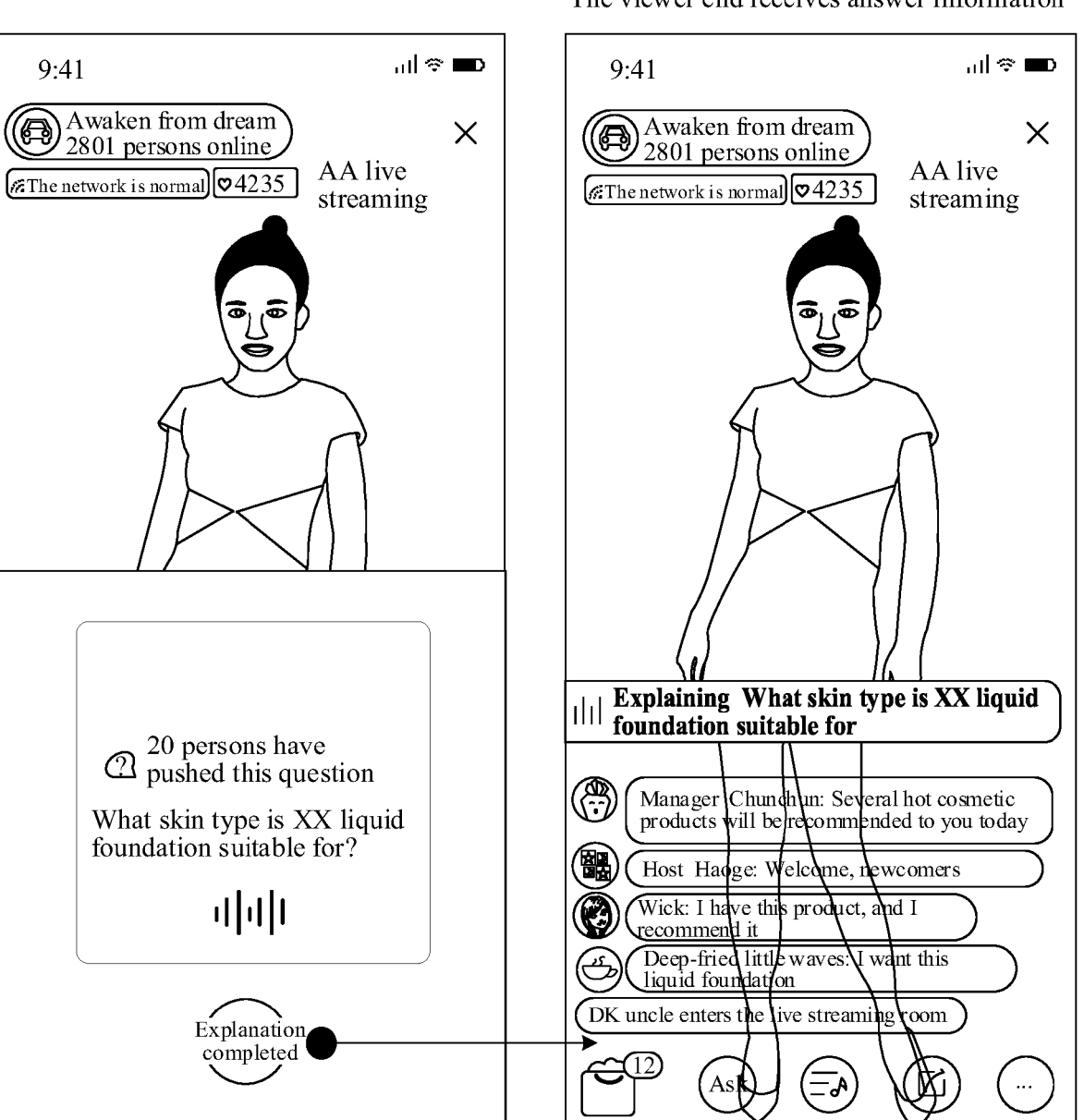
FIG. 9 is a schematic flowchart of completing question answering according to some embodiments.

FIG. 9 shows a schematic flowchart of completing question answering according to some embodiments. The terminal presents an answering completion function item "Explanation completed" of the question "What skin type is XX liquid foundation suitable for." When a triggering operation for the answering completion function item "Explanation completed" is received, in response to an answering completion instruction for the question "What skin type is XX liquid foundation suitable for" triggered based on the answering completion function item "Explanation completed," the answer information of the question is transmitted to the viewer end, and the viewer end explains, by presenting prompt information "Explaining-what skin type is XX liquid foundation suitable for," to the viewer the content currently being explained.

When the above embodiments are applied, by presenting an answering function entry corresponding to at least one question, when an answering operation for a target question triggered based on the answering function entry is received, a receiving process of corresponding answer information is presented, and when an answering completion instruction for the target question is received, the answer information of the target question is transmitted to a viewer end. Every question presented is obtained by aggregating questions asked by at least two viewers in a live streaming room. In this way, it is unnecessary to present all the questions raised by the viewers, which results in avoiding the repeated display of the same question. Therefore, a host can pay attention to additional different questions, thereby reducing phenomena of missed answers and repeated answers, and improving the efficiency of answering questions by a host end and the efficiency of information transfer between the host end and the viewer end.

Next, the method for processing the live streaming information according to some embodiments will continue to be described. FIG. 10 shows a schematic flowchart of a method for processing live streaming information according to some embodiments. In some embodiments, the method for processing live streaming information may be implemented by a server or a terminal alone, or implemented by a server and a terminal collaboratively. Taking the terminal implementation as an example, the method for processing live streaming information according to some embodiments includes the following operations:

Operation 1001: Present, by a terminal, a question editing interface in response to a triggering operation for a questioning function item of a live streaming.

The terminal corresponds to a viewer end, and is provided with an application client with a live streaming function, such as a live streaming client and an instant messaging client. In a case that a host end performs live streaming through the terminal provided with the application client and transmits a live streaming content to a back-end server in real time, and the back-end server forwards the content to the viewer end, and the live streaming can be watched through the application client arranged on the terminal of the viewer end.

In an example embodiment, live streaming may be used for recommending an item to the viewer end, for example, a commodity such as clothes and an electronic product. On the other hand, the viewer end can learn about the corresponding recommended item through the live streaming. When there is a question about a recommended item, or further understanding is intended, a question may be asked for the live streaming. At this time, the viewer end may enter a question editing interface through a questioning function item presented by the terminal. When receiving a triggering operation for the questioning function item for the live streaming, the terminal presents the question editing interface, and the question editing interface can support voice input or text input.

Operation 1002: Present, in response to a question editing operation triggered based on the question editing interface, at least one candidate question matching an edited content.

The candidate question is a historical question asked by at least one viewer in a live streaming room of a host. The candidate question is only presented when it is determined that a candidate question matching the edited content exists in the historical questions.

In some embodiments, the terminal may determine at least one candidate question matching the edited content in the following manner: acquiring, in response to the question editing operation triggered based on the question editing interface, the edited content based on the question editing operation; and matching, when a sentence pattern of the edited content is a question, the edited content with a historical question asked by at least one viewer in the live streaming room of the host, and obtaining and presenting at least one candidate question matching the edited content.

For example, after receiving the question editing operation triggered through the question editing interface, the terminal acquires the content edited based on the question editing operation. The terminal performs syntax analysis on the edited content, and when the sentence pattern of the edited content is determined to be a question, matches the edited content with historical questions asked by viewers in this live streaming room, so as to obtain at least one candidate question matching the edited content. In an actual implementation, a neural network model may be pre-constructed and trained, so as to predict, through the neural network model, a matching degree between the edited content and the historical questions asked by viewers in this live streaming room. Then, a historical question whose matching degree exceeds a matching degree threshold is used as at least one candidate question matching the edited content.

Figure 11:
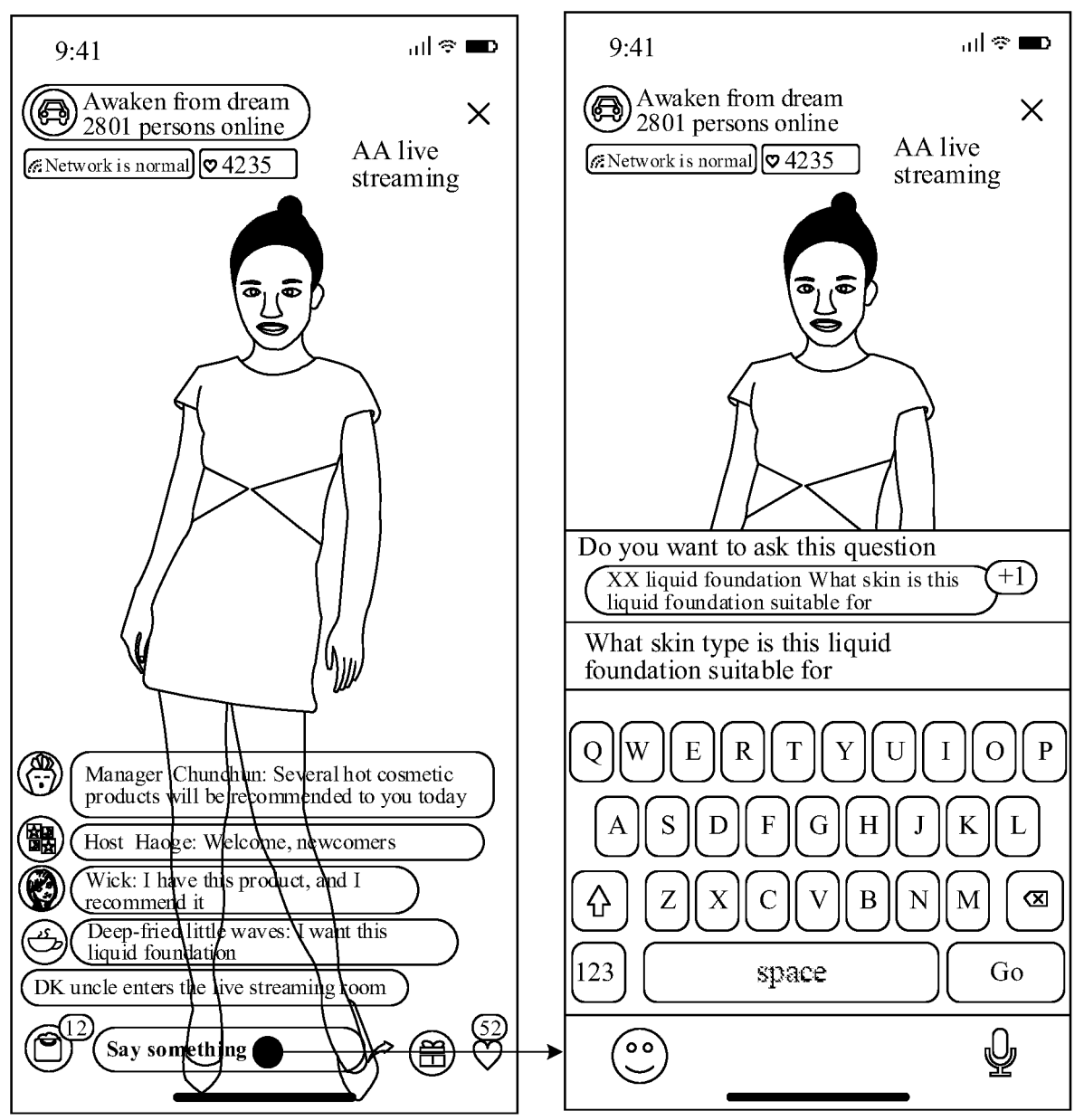
FIG. 11 is a schematic flowchart of a question editing operation according to some embodiments.

FIG. 11 shows a schematic flowchart of a question editing operation according to some embodiments. The terminal presents a questioning function item "Say something" in the live streaming interface, and when receiving a triggering operation for the questioning function item "Say something", the terminal presents a question editing interface including a text input box. The terminal receives a question editing operation performed by a viewer based on the text input box, presents an edited content "What skin type is this liquid foundation suitable for," and presents a candidate question "XX liquid foundation, what skin is this liquid foundation suitable for" that matches the edited content.

In some embodiments, at least one candidate question matching the edited content may have been answered, and at this time, the terminal may output answer information in the following manner: presenting an explanation function entry corresponding to answer information of the candidate question when the answer information corresponding to the candidate question exists; and outputting the answer information corresponding to the candidate question in response to a triggering operation for the explanation function entry.

When presenting the candidate question matching the edited content, if it is determined that answer information corresponding to the candidate question exists, the terminal may further present an explanation function entry corresponding to the answer information of the candidate question. When receiving a triggering operation for the explanation function entry on the viewer side, the terminal outputs the answer information of the candidate question in response to the triggering operation.

Figure 12:
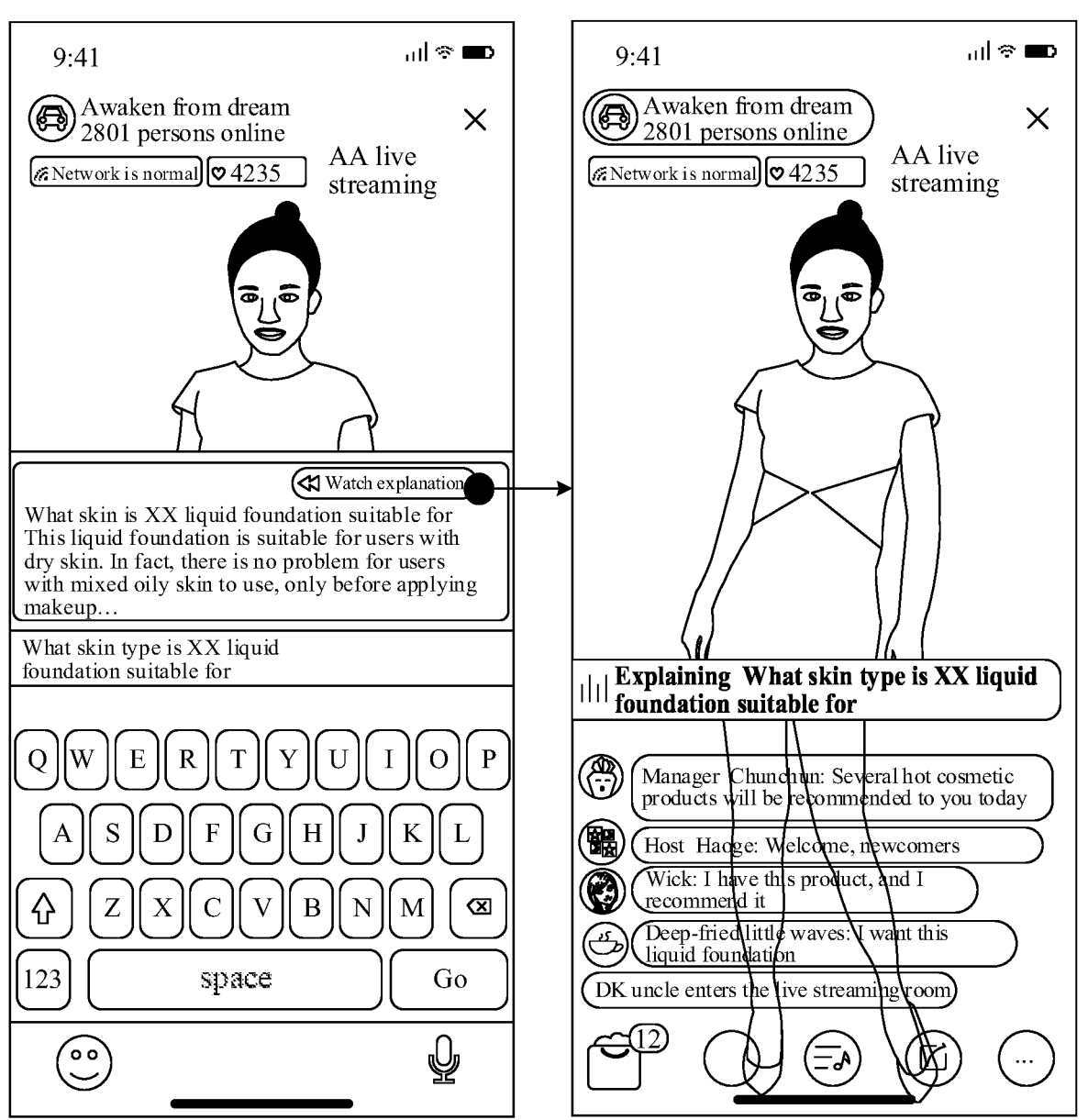
FIG. 12 is a schematic diagram of presenting an explanation function entry according to some embodiments.

FIG. 12 shows a first schematic diagram of presenting an explanation function entry according to some embodiments. The terminal presents an explanation function entry "Watch explanation" corresponding to the answer information of the candidate question "What skin type is XX liquid foundation suitable for," and also presents a text part of the answer information "This liquid foundation is suitable for users with dry skin . . . " When a triggering operation for the explanation function entry "Watch explanation" is received, a playback interface for playing the answer information in a video form is redirected to.

In some embodiments, when the viewer asks a question for the first time, that is, when no candidate question matching the edited content exists, the terminal may present a selection function item corresponding to the recommended item matching the edited content in the question editing interface. The selection function item is used for using, when a triggering operation for the selection function item is received, the recommended item corresponding to the selection function item as the content edited by the question editing operation.

In some embodiments, the terminal may obtain a candidate recommended item in the following manner: acquiring a historical live streaming content of the live streaming; inputting the historical live streaming content into a machine learning model; and predicting, through the machine learning model, a candidate recommended item, the candidate recommended item including a recommended item matching the edited content.

When the question inputted by the viewer is the first question in this live streaming, the viewer may be provided with a recommended content, such as a recommended commodity, an item, and model body information in the live streaming room to assist the viewer to complete the inputted question, thereby assisting the host to provide an accurate answer later. For example, in most cases, viewers will follow the rhythm of the host to ask corresponding questions. Therefore, the live streaming content of the live streaming may be acquired, specifically including a current live streaming content, a historical live streaming content, or the like, and a commodity recommended in the live streaming content may be determined through the video image recognition technology and the voice recognition technology. In an example embodiment, a machine learning model may be pre-constructed and trained, and the machine learning model that completes training may be used for predicting a candidate recommended item for the acquired historical live streaming content. The candidate recommended item includes a recommended item matching the edited content.

At this time, the terminal may present a selection function item corresponding to the recommended item matching the edited content. When a triggering operation for the selection function item is received, a recommended item corresponding to the selection function item is used as the content edited by this question operation, and specifically, the content matching the recommended item in the edited content will be replaced with the name of the recommended item.

FIG. 13 shows a schematic flowchart of selecting a recommended item according to some embodiments. The terminal presents recommended items "A liquid foundation" and "B liquid foundation" that match the content edited by the viewer, and sets selection function items of the corresponding recommended items based on the names of the recommended items. The terminal receives a tapping operation for the selection function item of "A liquid foundation," and uses "A liquid foundation" as a part of the edited content, for example, "A liquid foundation, what skin is this liquid foundation suitable for" as shown in FIG. 13.

Operation 1003: Transmit, in response to a determination instruction for a target question in the at least one candidate question, the target question to a host end.

The target question is used for aggregately displaying the target question and the candidate question matching the target question in a case that the host end receives the target question. The aggregately displaying is aggregating the target question and the candidate question matching the target question and displaying them as one question, and only increasing the quantity of questions asked by viewers for the question.

A corresponding determination function item may be set for the candidate question, such as a "+1" function item. When a triggering operation for the determination function item is received, a determination instruction for the target question is received, and the target question is transmitted to the host end, so as to increase the quantity of questions asked by viewers for the target question at the host end.

In some embodiments, after transmitting the target question to the host end, the terminal may present the target question. When a presentation duration of the target question reaches a target presentation duration, the presented target question is canceled.

The target presentation duration may be preset, such as 2 seconds, and when the target question is presented by the terminal, it may be presented according to the set target presentation duration. In an actual implementation, the presentation duration of the target question is timed, and when the presentation duration of the target question reaches the target presentation duration, the presented target question is canceled.

In some embodiments, the terminal may cancel the presented target question in the following manner: presenting a question unfolding function item; and retracting the presented target question into the question unfolding function item; where the question unfolding function item is used for being unfolded to present the target question when a triggering operation for the question unfolding function item is received.

In an example embodiment, canceling the presented target question may be retracting the target question into the question unfolding function item, and the question unfolding function item may be a floating button used for retracting all questions asked by viewers. When the target question is retracted in the question unfolding function item, the question unfolding function item is presented, and when a triggering operation for the question unfolding function item is received again, the question unfolding function item is unfolded to present the target question and other questions asked. Specifically, the presentation may be performed in the form of unfolding a floating layer.

Figure 14:
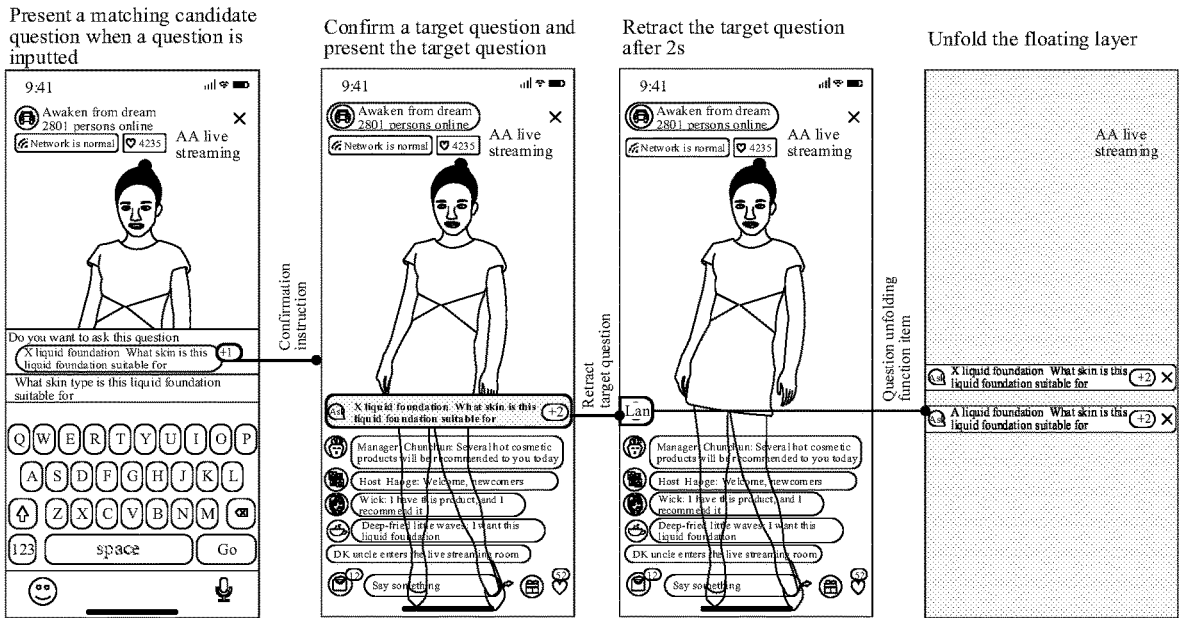
FIG. 14 is a schematic diagram of presenting a target question according to some embodiments.

FIG. 14 shows a schematic diagram of presenting a target question according to an embodiment of the disclosure. The terminal receives a confirmation operation for the target question, that is, a confirmation instruction triggered by the "+1" function item, and presents the target question "X liquid foundation, what skin is this liquid foundation suitable for" on the live streaming interface. After the presentation duration reaches the target presentation duration of 2*s*, the target question is retracted in the question unfolding function item, that is, a question unfolding floating button. When a triggering operation for the question unfolding function item is received, all asked questions including the target question, that is, "X liquid foundation, what skin is this liquid foundation suitable for" and "A liquid foundation, what skin is this liquid foundation suitable for" are presented based on the unfolded question unfolding function item.

In some embodiments, the terminal may also present a cancellation function item corresponding to the target question; and transmit, in response to a triggering operation for the cancellation function item, a cancellation instruction corresponding to the target question to the host end. The cancellation instruction is used for updating the quantity of questions asked by viewers corresponding to the target question when the host end receives the cancellation instruction.

Figure 15:
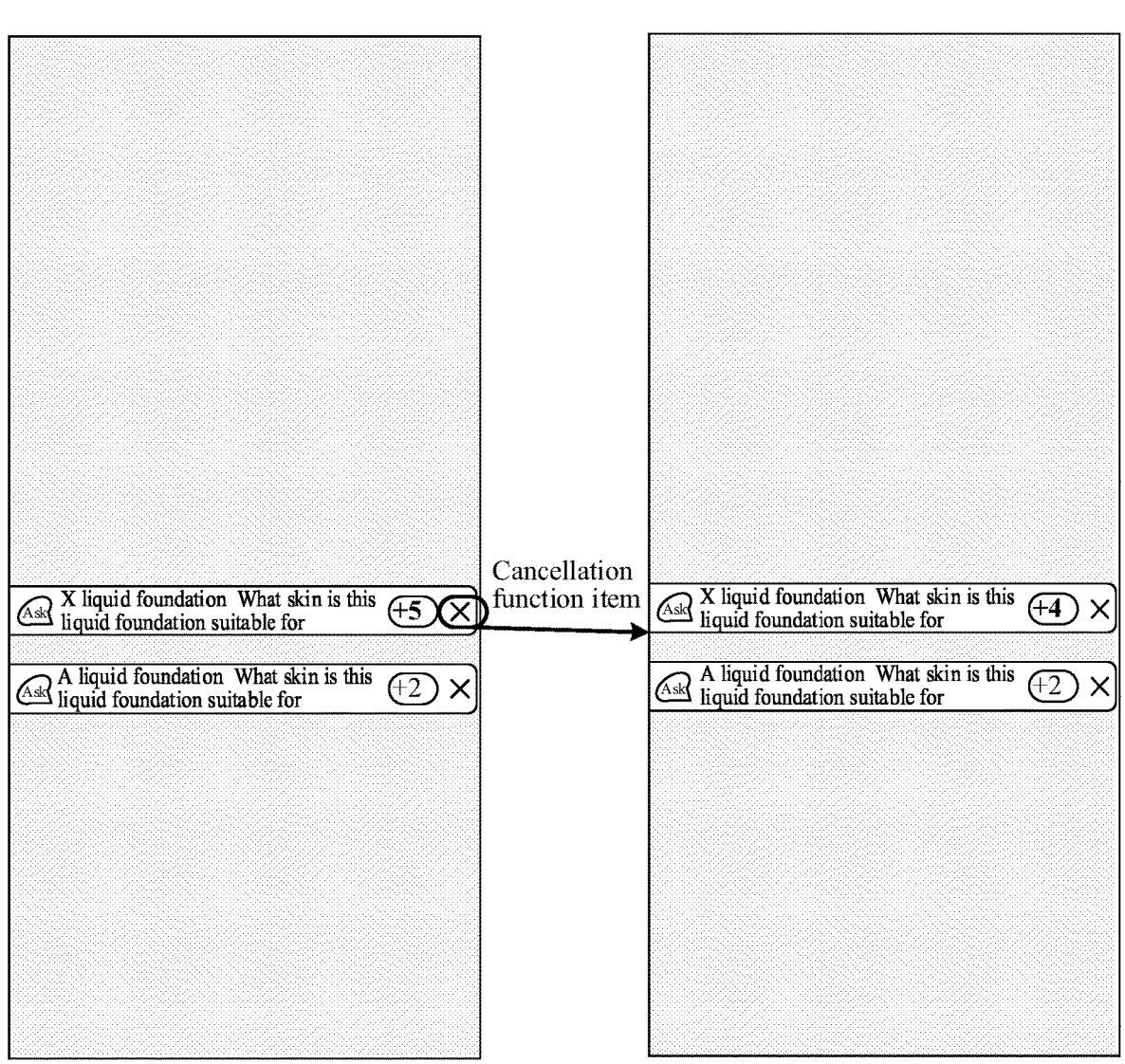
FIG. 15 is a schematic diagram of a cancellation function item of a target question according to some embodiments.

FIG. 15 shows a schematic diagram of a cancellation function item of a target question according to some embodiments. When presenting the target question, the terminal may also present a cancellation function item "x" corresponding to the target question, and cancels the target question when receiving a triggering operation for the cancellation function item "X." At this time, a cancellation instruction corresponding to the target question may be transmitted to the host end, so that the host end may respond to the cancellation instruction and reduce the quantity of questions asked by viewers corresponding to the target question. At the same time, the viewer end also updates the quantity of questions asked by viewers, that is, changes from 5 to 4.

In some embodiments, after the host answers the target question, the terminal may present an explanation function entry of answer information corresponding to the target question; and output, in response to a triggering operation for the explanation function entry, the answer information corresponding to the target question.

When answer information corresponding to the target question exists, an explanation function entry corresponding to the answer information of the target question may be presented. When a triggering operation for the explanation function entry is received, the answer information corresponding to the target question, such as answer information in a text form, is outputted.

In some embodiments, the terminal may output the answer information corresponding to the target question in the following manner: presenting a question answering interface; and presenting, in the question answering interface, the answer information in the text form corresponding to the target question.

Figure 16:
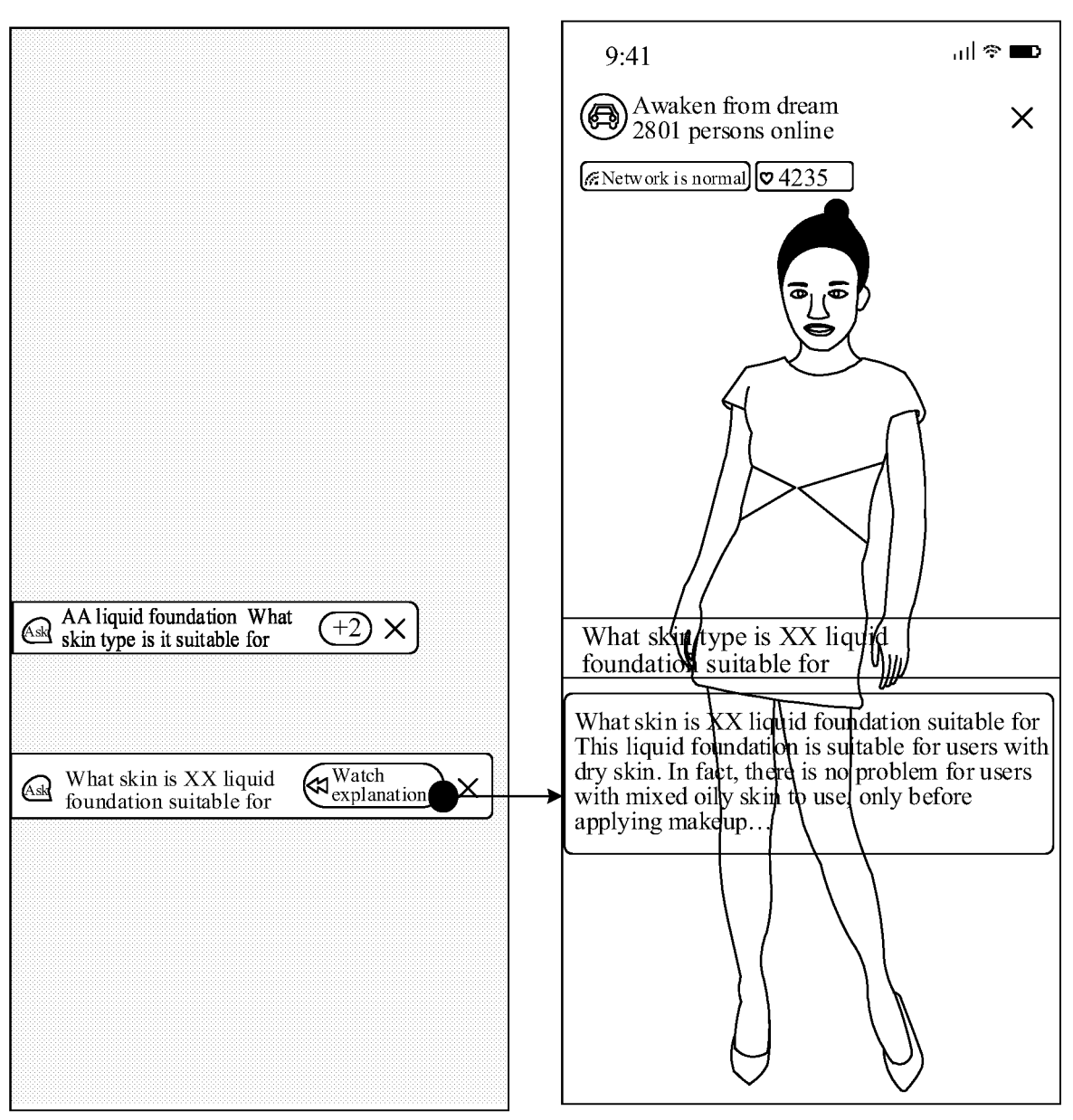
FIG. 16 is a first schematic diagram of outputting answer information according to some embodiments.

FIG. 16 shows a first schematic diagram of outputting answer information according to some embodiments. When presenting the target question, the terminal may also present an explanation function entry "Watch explanation" corresponding to the target question, and when receiving a triggering operation for the explanation function entry "Watch explanation," the terminal outputs the answer information corresponding to the target question. Specifically, the terminal may display, in the question answering interface, the answer information "This liquid foundation is suitable for users with dry skin . . . " in the text form.

In some embodiments, the terminal may output the answer information corresponding to the target question in the following manner: presenting a question answering window in the live streaming interface; and playing, through the question answering window, the answer information in a voice form or a video form corresponding to the target question.

Figure 17:
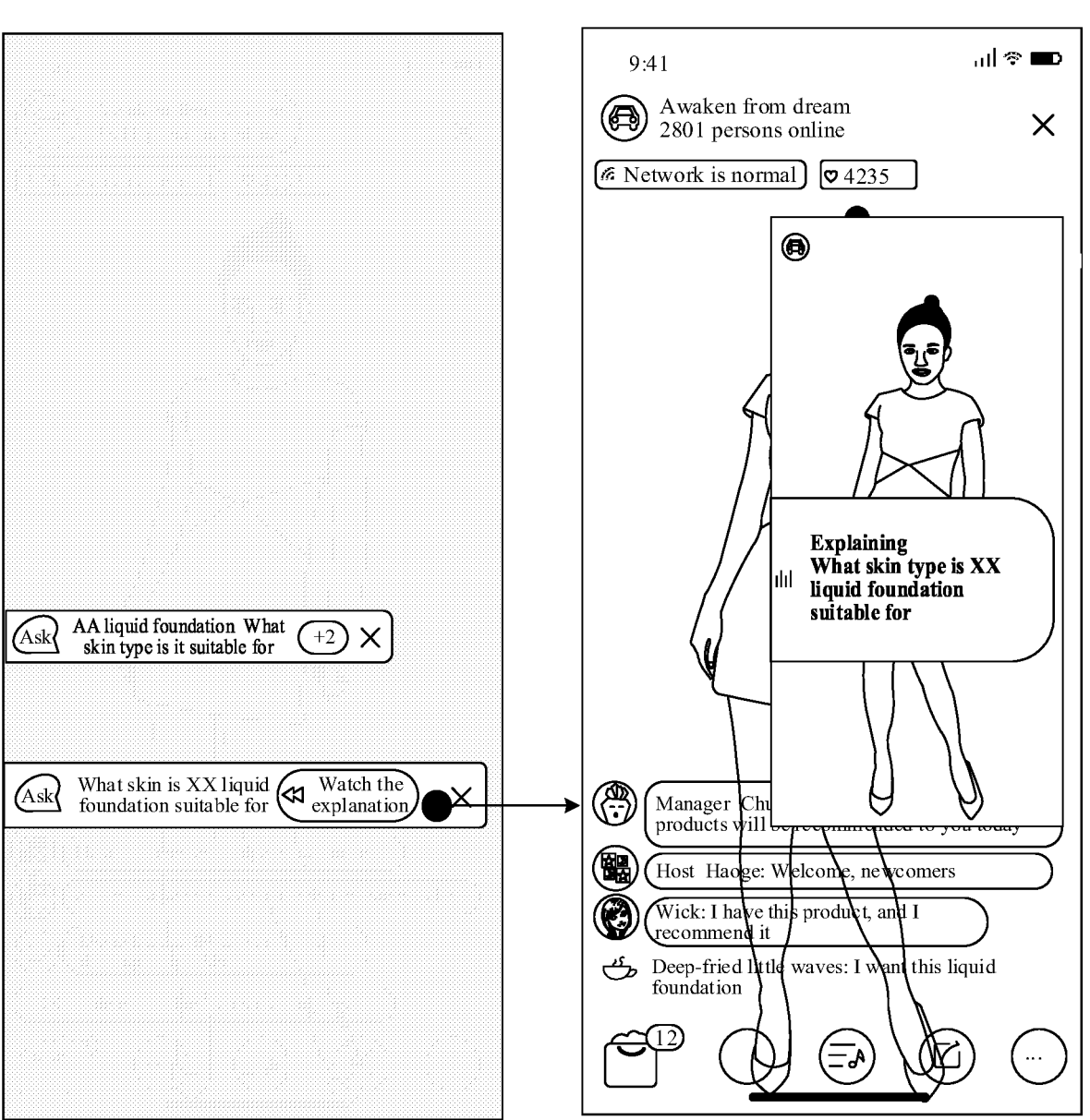
FIG. 17 is a second schematic diagram of outputting answer information according to some embodiments.

FIG. 17 shows a second schematic diagram of outputting answer information according to some embodiments. When presenting the target question, the terminal may also present an explanation function entry "Watch explanation" corresponding to the target question, and when receiving a triggering operation for the explanation function entry "Watch explanation," the terminal outputs the answer information corresponding to the target question. Specifically, the terminal may present a floating question answering window in the live streaming interface, and play, through the question answering window, the answer information in a video form corresponding to the target question.

By recommending and presenting a candidate question matching an edited content to a viewer end, when a confirmation operation for a target question in the candidate question is received, the target question is transmitted to a host end, so that the host end aggregates the target question and the candidate question matching the target question and displays them as one question, and only increases the quantity of questions asked by viewers. In this way, by aggregating the matching questions into one question, the problem that the same question appears repeatedly and not all the questions can be paid attention to is reduced, so that the host end can directly focus on key questions asked by viewers, reduce repetitive answers, and further avoid the phenomenon of missed answers, thereby improving the experience of the viewer end, and utilizing the host resources more efficiently at the same time.

Figure 18:
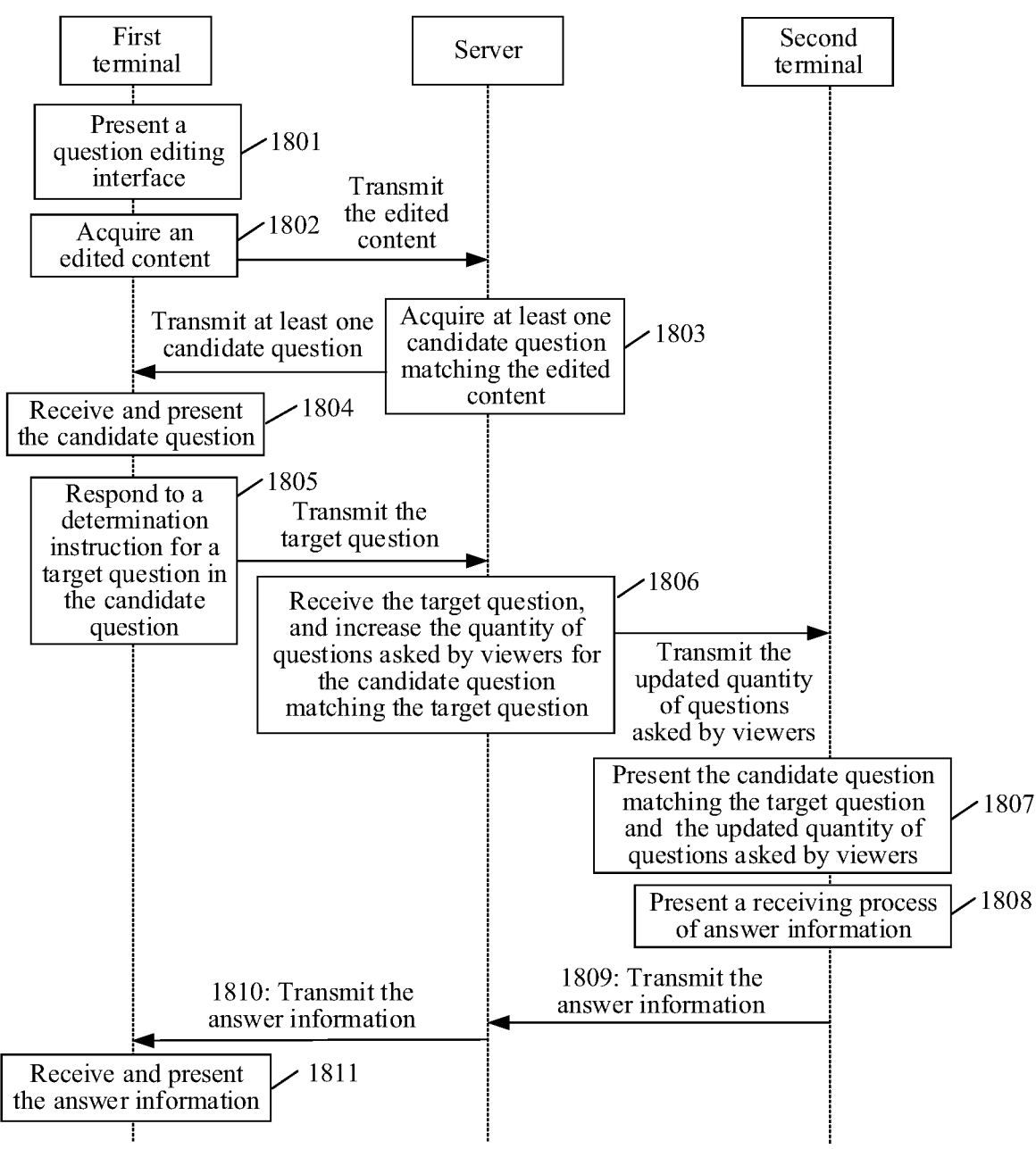
FIG. 18 is a schematic flowchart of a method for processing live streaming information according to some embodiments.

The method for processing live streaming information provided in some embodiments may be implemented cooperatively by a first terminal, a second terminal, and a server, where the first terminal corresponds to the viewer end, and the second terminal corresponds to the host end. FIG. 18 shows a schematic flowchart of a method for processing live streaming information according to some embodiments. The method for processing live streaming information according to some embodiments includes the following operations:

Operation 1801: Present, by a first terminal, a question editing interface in response to a triggering operation for a questioning function item of a live streaming.

Operation 1802: Acquire, in response to a question editing operation triggered based on the question editing interface, a content edited based on the question editing operation and transmit the content to a server.

Operation 1803: Receive, by the server, the content edited based on the question editing operation and transmitted by the first terminal, and acquire at least one candidate question matching the edited content and return the candidate question to the first terminal.

Operation 1804: Receive, by the first terminal, the at least one candidate question returned by the server and matching the edited content, and present the candidate question.

Operation 1805: Transmit, in response to a determination instruction for a target question in the at least one candidate question, the target question to the server.

Operation 1806: Receive, by the server, the target question transmitted by the first terminal, increase the quantity of questions asked by viewers for the candidate question matching the target question, and transmit the updated quantity of questions asked by viewers to a second terminal.

Operation 1807: Present, by the second terminal, the target question, the corresponding updated quantity of questions asked by viewers, and a corresponding answering function entry.

Operation 1808: Present, in response to an answering operation for a target question triggered based on the answering function entry, a receiving process of corresponding answer information.

Operation 1809: Transmit, in response to an answering completion instruction for the target question, the received answer information of the target question to the server.

Operation 1810: Receive, by the server, the answer information of the target question and transmit the answer information to the first terminal.

Operation 1811: Receive, by the first terminal, the answer information of the target question and present the answer information.

By recommending and presenting a candidate question matching an edited content to a viewer end, when a confirmation operation for a target question in the candidate question is received, the target question is transmitted to a host end, so that the host end aggregates the target question and the candidate question matching the target question and displays them as one question, and only increases the quantity of questions asked by viewers. In this way, by aggregating the matching questions into one question, the problem that the same question appears repeatedly and not all the questions can be paid attention to is reduced, so that the host end can directly focus on key questions asked by viewers, reduce repetitive answers, and further avoid the phenomenon of missed answers, thereby improving the experience of the viewer end, and utilizing the host resources more efficiently at the same time.

The following describes an example embodiment in an actual application scenario.

In a complete live streaming, for a host, the live streaming is continuous, and for a viewer, the live streaming is intermittent and fragmented. This leads to a time difference between the host and the viewer in the same space, and information transfer may be failed. One host or two hosts may have to face questions raised by hundreds or thousands of viewers. The scattering of the questions and the asymmetry of host resources make some viewers unable to acquire intended information.

FIG. 1A and FIG. 1B are schematic diagrams of a method for processing live streaming information according to the related art. In the related art, questions are usually highlighted by a host end using special signs. For example, an existing knowledge-based live streaming product will provide a question-asking entry for users to ask questions manually, and a host can see, through the presented question-asking entry, the questions raised by a viewer end and answer the questions, as shown in FIG. 1A.

Alternatively, a commodity explanation during a live streaming is segmented into clips for playback (such as in many e-commerce live streaming software), and in order to maximize the use of live streaming resources of the commodity explanation, segmented recording of the live streaming is edited in an interactive method of marking the explanation, and by manually editing the recording, a viewer can see a playback content clip of each commodity explanation at any time, as shown in FIG. 1B.

However, the solution of highlighting questions through special signs can only solve some live streaming scenarios. When the quantity of questions asked is too large, the questions still cannot be well displayed. The questions asked by viewers are all displayed on a public screen of the live streaming, and the questions asked are formal and binding, which cannot meet requirements of the viewers of asking any relevant questions anytime and anywhere. The solution of segmenting the live streaming commodity explanation into clips for playback solves the pain point that in a scenario of the commodity explanation, questions raised by viewers are ignored in a case of a large quantity of online users.

Figure 19A:
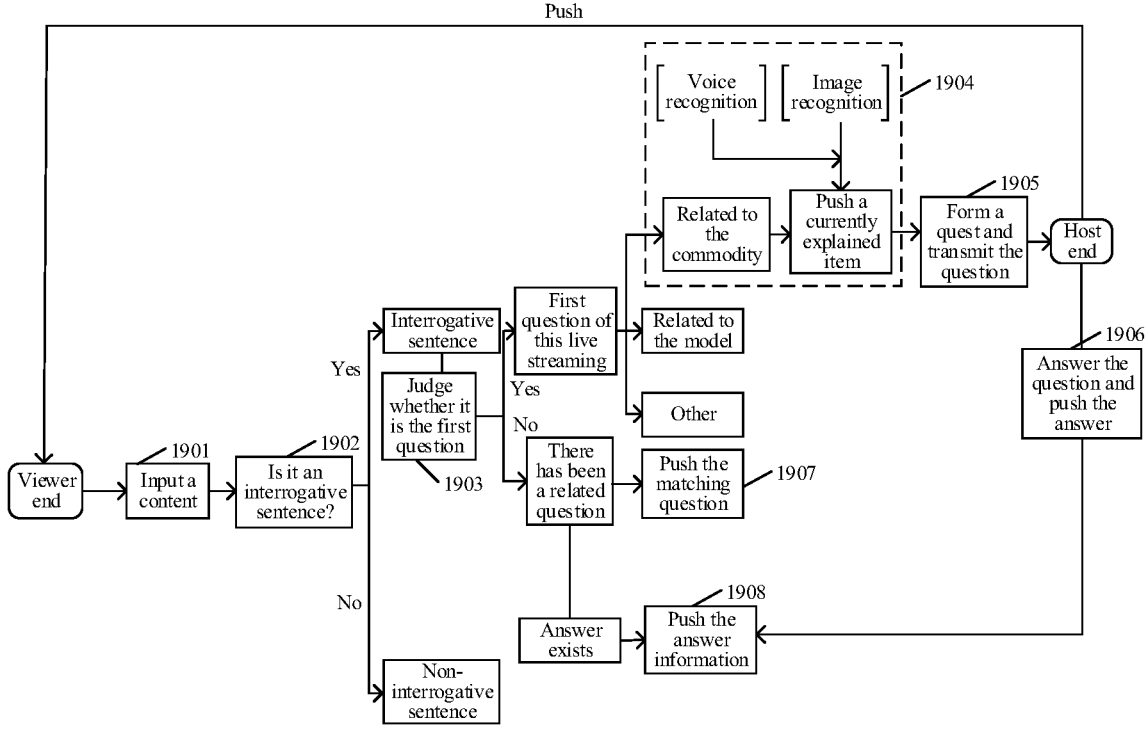
FIG. 19A is a schematic flowchart of a method for processing live streaming information according to some embodiments.

Based on this, some embodiments provide a method for processing live streaming information, so as to at least solve the above existing questions. FIG. 19A shows a schematic flowchart of a method for processing live streaming information according to some embodiments. The method for processing live streaming information according to an example embodiment of the disclosure includes the following operations:

Operation 1901: Input a content by a viewer end.

Operation 1902: Judge whether the inputted content is an interrogative sentence.

Operation 1903: Determine, when the inputted content is an interrogative sentence, whether it is the first question.

Operation 1904: Perform, when the inputted content is the first question, voice recognition and image recognition on a historical live streaming content to obtain a current recommended item, and push a currently explained item at a host end to a user.

Operation 1905: Receive a selection operation of the user for the recommended item, use the selected recommended item as a part of the inputted content, compose the question of the viewer end, and transmit the question to the host end.

Operation 1906: Answer, by the host end, the question and push the answer to the viewer end.

Operation 1907: Recommend, when the inputted content is not the first question, that is, when a matching question already exists, the matching question to the user.

Operation 1908: Recommend, in a case that answer information for the question matching the inputted content already exists, the matching question and present the answer information.

The method for processing live streaming information according to the embodiments of the disclosure will be described in detail below, including the following:

First, an initial question is established.

In an initial question establishing stage, that is, a viewer first asks a question that has not been addressed at the moment during this live streaming. At this time, it is necessary to acquire an inputted content of the viewer end during the live streaming, and perform semantic analysis and syntax analysis on the acquired inputted content to judge whether the inputted content of the viewer end is an interrogative sentence. In an example embodiment, the inputted content may be analyzed in the following manner:

1) Interrogative word classification: A specific interrogative sentence generally has interrogative word phrases, and a group of interrogative word phrases with the same meaning and usage constitute an interrogative word type. As shown in Table 1, the classification of some interrogative word phrases is included. For example, an interrogative word type corresponding to an interrogative word phrase "who/what type of person/whom/which person(s)" is "what type of person".

TABLE 1

Interrogative word classification

| Interrogative Word Phrase | Interrogative Word Type |
|---|---|
| who/what type of person/whom/which person(s) | what type of person |
| what reason/what cause/what karma | what reason |
| when/what time/which time/which moment | when |
| where/what place/which place/which location/what location | where |
| why/what for | why |
| . . . | . . . |

2) Question classification: There is a correspondence between interrogative word types and question types. An interrogative word type may correspond to one or a plurality of question types, and a question type may also correspond to a plurality of interrogative word types. For example, the question type "Why" corresponds to the interrogative word types "why, what reason, what," as shown in Table 2. Classifying questions requires identifying the question type to which a question belongs.

TABLE 2

Question Classification

| Interrogative Word Type | Sentence Pattern | Question Type |
|---|---|---|
| what type of person | (VP+)NP + is +<br>~NP + is + ~(+VP)~ +<br>VP + NP~ +<br>(say) + s | Who |

TABLE 2-continued

Question Classification

| Interrogative Word Type | Sentence Pattern | Question Type |
|---|---|---|
| Why | S + is(,) +<br>~NP + ~ + VP | Why |
| what reason | S + is + ~<br>~ + s | |
| What | reason/cause/sake +<br>of + S + is + ~ | |
| . . . | . . . | . . . |

3) Sentence Pattern Recognition

Figure 19B:
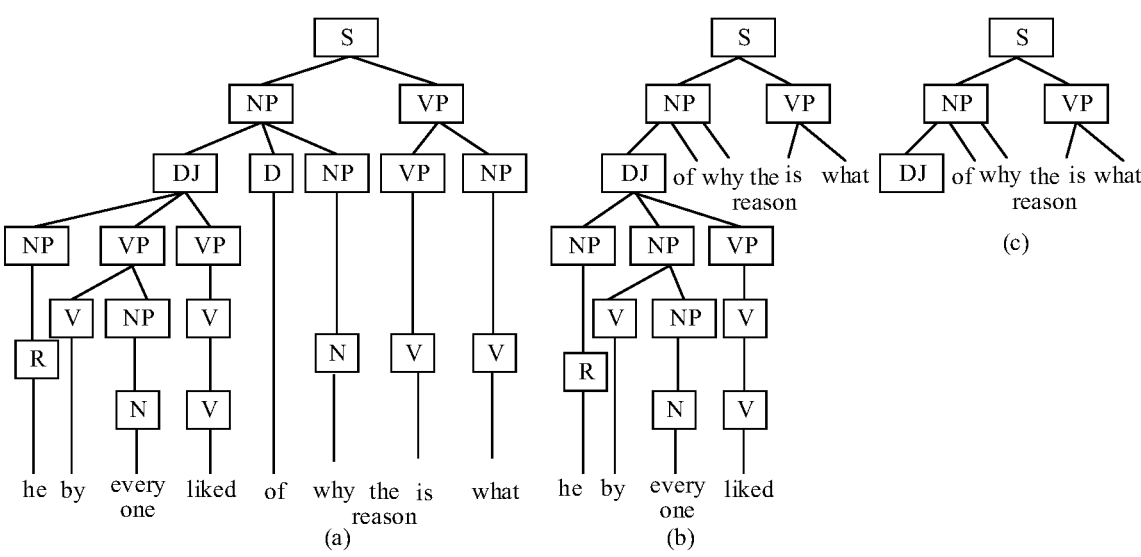
FIG. 19B is a schematic diagram of a syntax analysis according to some embodiments.

A syntax analysis is performed on a sentence s inputted by the viewer to obtain a syntax tree T of the sentence s. Taking the sentence pattern Mi shown in Table 2 as a template, a sentence structure Smi of the sentence s based on the sentence pattern Mi is obtained by disassembling the syntax tree. FIG. 19B show a schematic diagram of a syntax analysis according to some embodiments. Mi is a sentence pattern template of an interrogative sentence, and a sub-figure (a) in FIG. 19B is the syntax tree T for normally disassembling the sentence s. The following operations are included:

Operation 1: Delete a node with a degree 1 in the syntax tree T shown in the sub-figure (a). DJ is an ancestor node whose degree is not 1, other NP and VP are ancestor nodes whose degrees are both 1, and their child nodes will be deleted to obtain a sub-figure (b).

Operation 2: Delete non-feature words under the DJ child node in the syntax tree shown in the sub-figure (b). Feature words include "what type of person, why, what reason," and the like, and a syntax tree shown in a sub-figure (c) is obtained.

Operation 3: Delete a non-leaf node whose degree is 1 and has no sibling node in the syntax tree shown in the sub-figure (c), where the node DJ has a sibling node, so it does not need to be deleted at this time. Therefore, a syntax structure SMi of the sentence s as shown in the sub-figure (c) is finally obtained.

Then, a similarity between Mi and SMi is calculated, and the sentence pattern Mi corresponding to the maximum similarity is selected as the question sentence pattern of the sentence s. If the maximum similarity is less than a set threshold, the matching fails and the sentence s is not a question.

When it is determined according to the above operations that the inputted content of the viewer is of the question type, that is, when the viewer inputs question information, the viewer may be provided with a recommended content, such as a recommended commodity, an item, and model body information in the live streaming room to assist the viewer to complete the inputted question information, thereby assisting the host to provide an accurate answer later. For example, in most cases, viewers will follow the rhythm of the host to ask corresponding questions. Therefore, the live streaming content of the live streaming may be acquired, and specifically, a commodity recommended in the live streaming content may be determined through the video image recognition technology and voice recognition technology according to the current live streaming content, the historical live streaming content, or the like. In an actual implementation, the content of the live streaming may be recognized in the following manner:

The recognition of commodity images in videos may be achieved by a convolutional neural network. The process of recognizing a commodity image is divided into the following operations: information acquisition, preprocessing, feature extraction and selection, classifier design, and classification decision.

(1) Information acquisition: It refers to conversion of information such as light or sound into electrical information through sensors. In other words, basic information of a live streaming room scenario is acquired and then converted, through the method of a convolutional neural network, into information that can be recognized by a machine.

(2) Preprocessing: It mainly refers to operations of de-noising, smoothing, transformation, and the like during image processing, so as to strengthen important features of a commodity image in the live streaming room.

(3) Feature extraction and selection: It refers to the need for feature extraction and selection during pattern recognition. In an implementation process, the convolutional neural network is actually divided into two layers, one is a convolution layer and the other is a convergence layer. The convolution layer scatters a scenario picture in the live streaming room into small pixel blocks of 3*3/5*5, then arranges these output values in an image group, and uses numbers to represent contents of various regions in the photo, where number axes represent the height, the width, and the color, respectively. Then, a three-dimensional numerical expression of each tile is obtained. The convergence layer combines the spatial dimension of the three-dimensional (or four-dimensional) image group with a sampling function, and outputs an associative array that contains only relatively important parts of the image.

(4) Classifier design: It refers to obtaining a recognition rule through training, and a feature classification may be obtained through the recognition rule, so that the image recognition technology can obtain a high recognition rate. In this way, relevant labels and classes are formed, and then classification decisions are made and commodity classes in the live streaming room are recognized. For example, when a skipping rope item is placed in the live streaming room, if it is recognized as a skipping rope, a relevant commodity keyword such as "electronic skipping rope" and "skip rope" will be generated. When there is an item such as an earphone in the background of the live streaming room, a relevant commodity keyword such as "wireless earphone" and "Bluetooth earphone" will be generated.

Based on the commodity keywords obtained by recognition, the back-end server will request the server of the relevant e-commerce platform to search for keywords in the live streaming products and perform image matching, and the back-end server will transmit data that succeeds in matching back to the live streaming client, thereby determining the commodity recommended by the live streaming room.

In addition, considering a scenario of different categories, such as beauty products, performing image recognition is difficult. Based on the image recognition, voice recognition may also be added to complement each other. The recognized content is compared with commodities in a commodity library, and when there is a match, the commodity name is highlighted for the viewer end. In addition, considering a scenario of clothes, the height and the weight of a model are the most mentioned questions, and when similar questions are recognized, the associated recommended content will be displayed by a host name.

Second, question clustering is processed.

Viewers often have the same feelings and questions when watching a live streaming. Therefore, questions asked by the viewer end may be clustered, and the above helps the host to improve the efficiency of solving problems.

When it is determined that the inputted content of the viewer end is a question, the inputted question is matched with historical questions asked by other viewers in the live streaming room, so as to determine at least one candidate question matching the current inputted question, and then present the candidate question to the viewer for selection by the viewer.

Figure 19C:
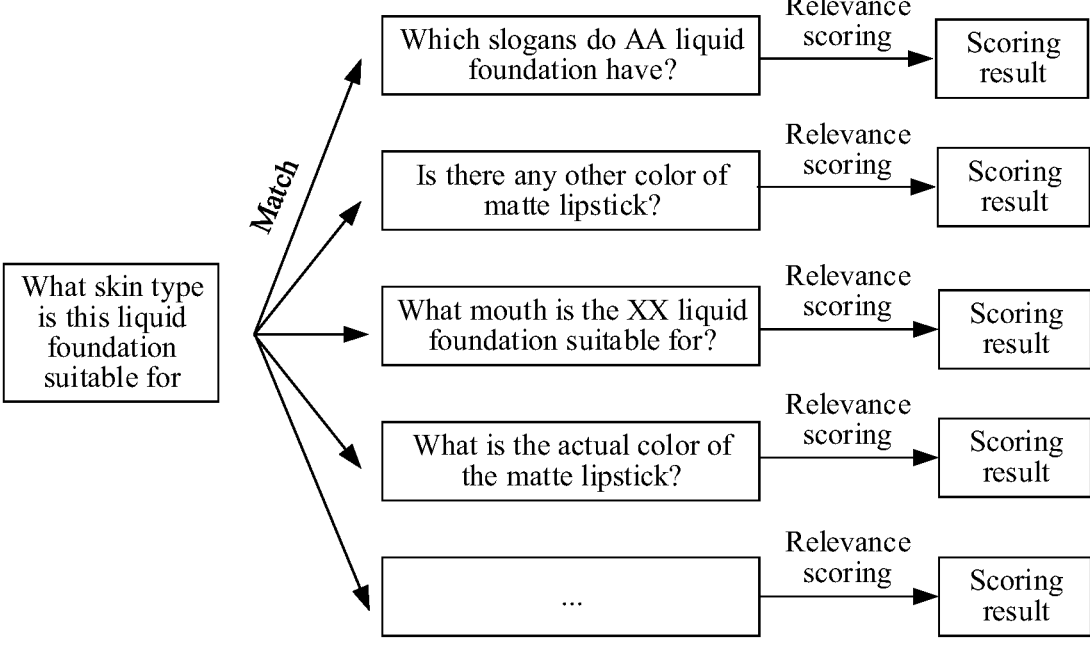
FIG. 19C is a schematic diagram of determining a candidate question according to some embodiments.

In an example embodiment, it may be judged, in the following manner, whether there is a historical question similar to the content inputted by the viewer end, that is, at least one candidate question matching the inputted question is determined by pre-constructing and training a convolutional neural network model used for relevance scoring of question relation; and inputting the acquired question inputted by the viewer into the trained convolutional neural network model, and predicting at least one candidate question matching the current inputted question. Specifically, the convolutional neural network may output a relevance score between the currently inputted question and all historical questions asked. Then, according to the outputted scoring results, a historical question with the highest relevance score is selected as the matching candidate question. In an actual implementation, oral expressions explained by viewers will be different. At this time, a semantic analysis of the intelligent semantic processing technology may be used for disassembling and analyzing words of the asked question, and make corresponding content matching. FIG. 19C shows a schematic diagram of determining a candidate question according to some embodiments. Semantic matching is performed on "What skin type is this liquid foundation suitable for" respectively with historical questions "Is there any other color of matte lipstick," "What skin type is this XX liquid foundation suitable for," and so on to perform relevance scoring, and output corresponding scoring results, so that according to the scoring results, a candidate question matching the question "What skin type is this liquid foundation suitable for" is selected from the historical questions.

After determining at least one candidate question matching the currently inputted question, the at least one candidate question is presented to the user through the live streaming client on the viewer end. Specifically, the matching questions may be clustered and the quantity of questions asked by viewers corresponding to the question may be displayed.

In an example embodiment, the terminal corresponding to the viewer end may present a questioning function item for the live streaming, and the viewer may enter a question editing interface through the questioning function item, so as to publish a question he/she intends to ask. When it is determined that there is a historical question whose similarity with the inputted question reaches a similarity threshold in this live streaming, the viewer is recommended and presented with the historical question whose similarity reaches the similarity threshold, and a "+1" function item is presented corresponding to the historical question. When receiving a tapping operation of the viewer on the "+1" function item, the quantity of questions asked by viewers corresponding to the question is increased and fed back to the host end, as shown in FIG. 14. On the host end, as the quantity of questions asked by viewers increases, the color changes (for example, the barrage presenting the question gradually changes from transparent to light red or even dark red) to remind the host to pay attention to and answer the question in time.

At the same time, the terminal corresponding to the viewer end may also present a question unfolding function item, and when receiving a triggering operation from the viewer for the question unfolding function item, present the current question to the viewer. As shown in FIG. 14, a question asked by a viewer and a commodity name he/she intends to ask are automatically displayed, and after a preset presentation duration (such as 2 s), the question is retracted in a question spread function floating button. When a tapping operation for the question spread function floating button is received, the question asked by the viewer is presented. At the same time, a cancellation function item corresponding to the question may also be presented, such as a close button. When a tapping operation for the cancellation function item is received, the question will be canceled.

Third, the host end responds to the question of the viewer.

In an example embodiment, an answering function entry of the question may be set in a more prominent position on the live streaming interface, and at the same time, the question asked by the viewer end and the corresponding quantity of questions asked by viewers may be presented in a scrolling manner. Moreover, with the increase of the quantity of questions asked by viewers, the color is changed to remind the host to pay attention to and answer the question of the viewer in time. Specifically, the viewer question may be answered in the following manner:

Since a question answering function entry is presented at the terminal corresponding to the host end, the host may enter a question answering interface through the answering function entry. In the question answering interface, the questions received from the viewer end are presented in the form of stacked cards, as shown in FIG. 6A. At the same time, an answering function entry "Answer" and a delayed answering function item "Answer Later" are presented at the bottom of the card for each question. When receiving a tapping operation of the host for the answering function entry "Answer," a receiving process of answer information corresponding to the question of this card is presented.

At the same time, the terminal corresponding to the host end further presents an answering completion function item "Explanation completed." When a tapping operation of the host for the answering completion function item "Explanation completed" is received, the card of the currently answered question will automatically slide out from the left, thereby presenting a next question to be answered. The answering function entry "Answer" is a start state of answering the question, and the answering completion function item "Explanation completed" is an end state of answering the question. The answer information of the host may be marked for secondary use.

When the host end taps on an "Answer" button of the answering function entry, the viewer end will receive the answer information being entered by the host end. At this time, the terminal corresponding to the viewer end presents the received answer information, and also presents prompt information of the question currently being explained, as shown in FIG. 9. Therefore, it facilitates the viewer who asks the question to explicitly receive that the asked question is being answered by the host end, and also enables non-askers to learn which question is currently being explained by the host end.

Fourth, the answer information is reused.

When there is a historical question matching the question inputted by the viewer end, and there is answer information corresponding to the historical question, the answer information may be presented to the viewer in a text form; and an explanation function entry "Watch explanation" is presented. When a tapping operation for the explanation function entry "Watch explanation" is received, detailed answer information may be presented. For example, the answer information in a video form may be played, and the like, as shown in FIG. 9.

For those who ask questions, the terminal may also retract the entry with the questions they asked, and present the explanation function entry "Watch explanation" corresponding to the question, as shown in FIG. 17.

Through the above embodiments, in the first aspect, the feeling of the viewer being paid attention to may be enhanced. When a question of a viewer is ignored, a strong sense of loss will occur, which in turn will discourage his/her enthusiasm for interaction and form a vicious circle of weakened stickiness between the host and the viewer end. Additionally, the present disclosure provides a shortcut for a viewer to ask a question, so that the question of the viewer about a commodity can be directly passed on to the host. When the host can pay attention to and specifically answer the question of a certain viewer, the viewer is provided with a strong sense of attention, thereby meeting psychological self-esteem needs of the viewer.

In the second aspect, host resources can be efficiently focused. The one-to-many communication form in the live streaming determines that the energy of the host will not be able to fully cover all the viewers. The AI technology may be used to cluster the asked questions and push them to the host, which is convenient for the host to answer key questions and reduce repetitive answers. In addition, the content answered by the host is reused, so that viewers who have the same question in the future can directly obtain the answer without repeating the question.

In the third aspect, the consumption conversion rate can be improved. When the viewer end is emotionally satisfied, it will greatly enhance the viewer's desire to consume, thereby increasing the conversion rate. In addition, after receiving the question, when the host exposes the commodity that the viewer end is interested in multiple times, the sales conversion of the hot-selling commodity can be improved, and the explanation of the commodities may be prioritized.

Figure 20:
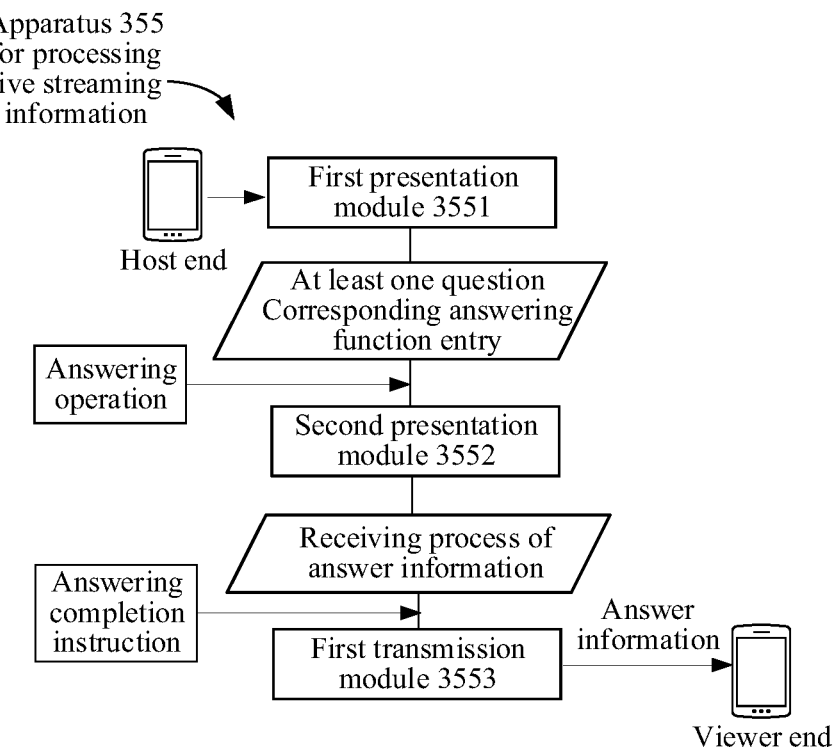
FIG. 20 is a schematic structural diagram of an apparatus for processing live streaming information according to some embodiments.

The following describes an apparatus 355 for processing live streaming information according to some embodiments. In some embodiments, the apparatus for processing live streaming information may be implemented in the form of software modules or code. FIG. 20 shows a schematic structural diagram of an apparatus 355 for processing live streaming information according to some embodiments. The apparatus 355 for processing live streaming information according to some embodiments includes:

a first presentation module 3551 configured to present at least one question of a live streaming and an answering function entry corresponding to the at least one question;

each question being obtained by aggregating questions asked by at least two viewers in a live streaming room of a host;

a second presentation module 3552 configured to present, in response to an answering operation for a target question triggered based on the answering function entry, a receiving process of corresponding answer information; and a first transmission module 3553 configured to transmit, in response to an answering completion instruction for the target question, the received answer information of the target question to a viewer end.

In some embodiments, the first presentation module 3551 may be configured to present a question answering function entry in a live streaming interface of the host; and present, in response to a triggering operation for the question answering function entry, the at least one question and an answering function entry corresponding to each question.

In some embodiments, the first presentation module 3551 may be further configured to present, in the live streaming interface of the host, a floating button used as the question answering function entry.

Correspondingly, the first presentation module 3551 may be further configured to present a question answering interface in response to a triggering operation for the floating button; and present, in the question answering interface, the at least one question and the answering function entry corresponding to each question.

In some embodiments, the first presentation module 3551 may be further configured to present a card floating layer corresponding to each question in a stacked manner, and present, in the card floating layer corresponding to each question, an answering function entry for the corresponding question.

In some embodiments, the first presentation module 3551 may be further configured to slide out a card floating layer corresponding to the target question from the live streaming interface in response to an answering completion instruction for the target question, and present a card floating layer corresponding to a question adjacent to the target question.

In some embodiments, the first presentation module 3551 may be further configured to present, in the card floating layer corresponding to each question, a delayed answering function item of a corresponding question;

where the delayed answering function item is used for sliding out the card floating layer of the corresponding question from the live streaming interface when a triggering operation for the delayed answering function item is received, and present a card floating layer under the slid-out card floating layer.

In some embodiments, the first presentation module 3551 may be further configured to present, in the live streaming interface of the host, the at least one question and the answering function entry corresponding to each question in the form of a barrage.

In some embodiments, the first presentation module 3551 may be further configured to present the quantity of questions asked by viewers corresponding to each question.

In some embodiments, the first presentation module 3551 may be further configured to present alarm information corresponding to a question of which the quantity of questions asked by viewers exceeds a threshold of the quantity of questions asked, wherein the alarm information is used for indicating a processing priority of the corresponding question.

In some embodiments, the apparatus may further include: an outputting module configured to acquire a sum of the quantity of questions asked by viewers corresponding to the at least one question;

compare the sum of the quantity of questions asked by viewers with at least two preset quantity thresholds respectively to obtain a comparison result; and output prompt information corresponding to the comparison result, the prompt information being used for prompting a degree of urgency of answering the at least one question.

In some embodiments, the second presentation module 3552 may be configured to present, in response to a triggering operation for the answering function entry corresponding to the target question, a text answer input box corresponding to the target question; and sequentially present, along with an answering operation in a text form performed based on the text answer input box, answer information in a text form received based on the text answer input box.

In some embodiments, the second presentation module 3552 may be configured to present, in response to a triggering operation for the answering function entry corresponding to the target question, voice collection prompt information corresponding to the target question;

wherein the voice collection prompt information is used for prompting that answer information in a voice form for the target question is being collected; and present, along with an answering operation in a voice form performed based on the voice collection prompt information, a changing process of a style of the voice collection prompt information.

In some embodiments, the first transmission module 3553 may be further configured to present an answering completion function item corresponding to the target question; and transmit, in response to an answering completion instruction for the target question triggered based on the answering completion function item, the received answer information of the target question to the viewer end.

When the above embodiments are applied, by presenting an answering function entry corresponding to at least one question, when an answering operation for a target question triggered based on the answering function entry is received, a receiving process of corresponding answer information is presented, and when an answering completion instruction for the target question is received, the answer information of the target question is transmitted to a viewer end. Every question presented is obtained by aggregating questions asked by at least two viewers in a live streaming room. In this way, it is unnecessary to present all the questions raised by the viewers, that is, to avoid repeated display of the same question, so that a host can pay attention to more other different questions, thereby reducing phenomena of missed answers and repeated answers, and improving the efficiency of answering questions by a host end and the efficiency of information transfer between the host end and the viewer end.

Figure 21:
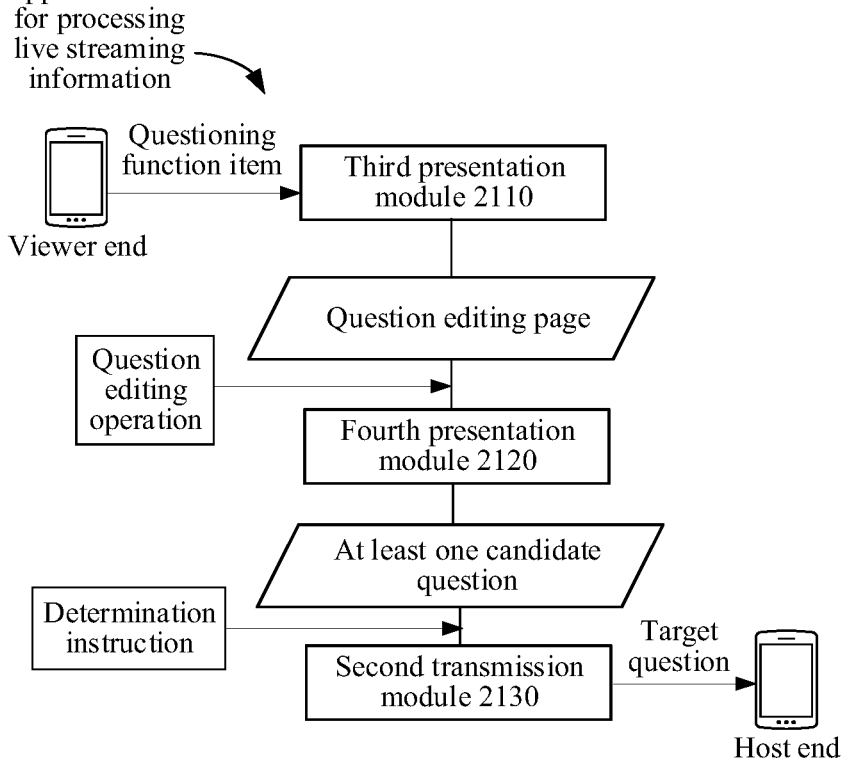
FIG. 21 is a schematic structural diagram of an apparatus for processing live streaming information according to some embodiments.

An apparatus 2100 for processing live streaming information according to some embodiments will be illustrated continuously below. In some embodiments, the apparatus for processing live streaming information may be implemented in the form of software modules or code. FIG. 21 shows a schematic structural diagram of an apparatus 2100 for processing live streaming information according to some embodiments. The apparatus 2100 for processing live streaming information includes:

a third presentation module 2110 configured to present a question editing interface in response to a triggering operation for a questioning function item of a live streaming;

a fourth presentation module 2120 configured to present, in response to a question editing operation triggered based on the question editing interface, at least one candidate question matching an edited content, the candidate question being a historical question asked by at least one viewer in a live streaming room of a host; and a second transmission module 2130 configured to transmit, in response to a determination instruction for a target question in the at least one candidate question, the target question to a host end;

the target question being used for aggregately displaying the target question and the candidate question matching the target question in a case that the host end receives the target question.

In some embodiments, the apparatus may further include:

a fifth presentation module configured to present, in the question editing interface, a selection function item corresponding to a recommended item matching the edited content when no candidate question matching the edited content exists;

wherein the selection function item is used for using, when a triggering operation for the selection function item is received, the recommended item corresponding to the selection function item as the content edited by the question editing operation.

In some embodiments, the fifth presentation module may be further configured to acquire a historical live streaming content of the live streaming;

input the historical live streaming content into a machine learning model; and predict, through the machine learning model, a candidate recommended item, the candidate recommended item including a recommended item matching the edited content.

In some embodiments, the apparatus may further include:

a sixth presentation module configured to present the target question after the target question is transmitted to the host end; and cancel the presented target question when a presentation duration of the target question reaches a target presentation duration.

In some embodiments, the sixth presentation module may be further configured to present a question unfolding function item; and retract the presented target question into the question unfolding function item;

wherein the question unfolding function item is used for being unfolded to present the target question when a triggering operation for the question unfolding function item is received.

In some embodiments, the sixth presentation module may be further configured to present a cancellation function item corresponding to the target question; and transmit, in response to a triggering operation for the cancellation function item, a cancellation instruction corresponding to the target question to the host end;

wherein the cancellation instruction is used for updating the quantity of questions asked by viewer corresponding to the target question when the host end receives the cancellation instruction.

In some embodiments, the sixth presentation module may be further configured to present an explanation function entry of the answer information corresponding to the target question; and output, in response to a triggering operation for the explanation function entry, the answer information corresponding to the target question.

In some embodiments, the sixth presentation module may be further configured to present a question answering interface; and present, in the question interface, the answer information in a text form corresponding to the target question.

In some embodiments, the sixth presentation module may be further configured to present a question answering window in the live streaming interface; and play, through the question answering window, the answer information in a voice form or video form corresponding to the target question.

In some embodiments, the fourth presentation module 2120 may be further configured to present, when answer information corresponding to the candidate question exists, an explanation function entry corresponding to the answer information of the candidate question; and output the answer information corresponding to the candidate question in response to a triggering operation for the explanation function entry.

In some embodiments, the fourth presentation module 2120 may be further configured to acquire, in response to a question editing operation triggered based on the question editing interface, a content edited based on the question editing operation; and match, when a sentence pattern of the edited content is a question, the edited content with a historical question asked by at least one viewer in the live streaming room of the host, and obtain and present at least one candidate question matching the edited content.

When the above embodiments are applied, by recommending and presenting a candidate question matching an edited content to a viewer end, when a confirmation operation for a target question in the candidate question is received, the target question is transmitted to a host end, so that the host end aggregates the target question and the candidate question matching the target question and displays them as one question, and only increases the quantity of questions asked by viewers. In this way, by aggregating the matching questions into one question, the problem that the same question appears repeatedly and not all the questions can be paid attention to is reduced, so that the host end can directly focus on key questions asked by viewers, reduce repetitive answers, and further avoid the phenomenon of missed answers, thereby improving the experience of the viewer end, and utilizing the host resources more efficiently at the same time.

An embodiment of the disclosure further provides an electronic device, including:

a memory, configured to store executable instructions; and a processor configured to implement, when executing the executable instructions stored in the memory, the method for processing live streaming information according to the embodiments of the disclosure.

An embodiment of the disclosure further provides a computer program product or computer program, where the computer program product or computer program includes computer instructions, and the computer instructions are stored in a computer-readable storage medium. A processor of the computer device reads the computer instructions from the computer-readable storage medium, and the processor executes the computer instructions to cause the computer device to perform the method for processing live streaming information according to the embodiments of the disclosure.

An embodiment of the disclosure further provides a computer-readable storage medium storing executable instructions, and the executable instructions, when executed by a processor, implement the method for processing live streaming information according to the embodiments of the disclosure.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories. The computer may be various computing devices including intelligent terminals and servers.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

After considering the specification and practicing the disclosed embodiments, a person skilled in the art may easily conceive of other embodiments of the disclosure. The disclosure is intended to cover any variations, uses, or adaptive changes of the disclosure following the general principles of the disclosure, and includes well-known knowledge and conventional technical means in the art and undisclosed in the disclosure.

It is to be understood that the disclosure is not limited to the precise structures described above and shown in the accompanying drawings, and various modifications and changes may be made without departing from the scope of the disclosure. The scope of the disclosure is subject only to the appended claims.

What is claimed is:

1. A method for processing live streaming information, performed by a terminal having at least one processor, the method comprising:

presenting at least one question asked by viewers directed to a host of a live streaming and an answering function entry corresponding to the at least one question, each question being obtained by aggregating questions asked by at least two viewers in a live streaming room of the host;

transmitting, based on the at least one question, a candidate question to the viewers;

receiving, from a first terminal in response to selection of a trigger option displayed with the candidate question, a target question and increasing a quantity of questions asked by viewers for the candidate question matching the target question;

presenting, on a second terminal, the candidate question matching the target question and an updated quantity of questions asked by the viewers for the candidate question matching the target question;

presenting, on the second terminal in response to an answering operation for the target question triggered based on the answering function entry, a receiving process of corresponding answer information; and transmitting, to the first terminal in response to an answering completion instruction for the target question, the received answer information of the target question to a viewer end.

2. The method according to claim 1, wherein the presenting at least one question of a live streaming and an answering function entry corresponding to the at least one question comprises:

presenting a question answering function entry in a live streaming interface of the host; and presenting, in response to a triggering operation for the question answering function entry, the at least one question and the answering function entry corresponding to each question.

3. The method according to claim 2, wherein the presenting a question answering function entry in a live streaming interface of the host comprises:

presenting, in the live streaming interface of the host, a floating button used as the question answering function entry; and the presenting, in response to a triggering operation for the question answering function entry, the at least one question and an answering function entry corresponding to each question comprises:

presenting a question answering interface in response to a triggering operation for the floating button; and presenting, in the question answering interface, the at least one question and the answering function entry corresponding to each question.

4. The method according to claim 1, wherein the presenting at least one question of a live streaming and an answering function entry corresponding to the at least one question comprises:

presenting a card floating layer corresponding to each question in a stacked manner, and presenting, in the card floating layer corresponding to each question, an answering function entry for the corresponding question.

5. The method according to claim 4, further comprising:

sliding out the card floating layer corresponding to the target question from the live streaming interface in response to the answering completion instruction for the target question, and presenting the card floating layer corresponding to a question adjacent to the target question.

6. The method according to claim 4, further comprising:

presenting, in the card floating layer corresponding to each question, a delayed answering function item of the corresponding question;

wherein the delayed answering function item is used for sliding out the card floating layer of the corresponding question from the live streaming interface in a case that a triggering operation for the delayed answering function item is received, and presenting the card floating layer under the slid-out card floating layer.

7. The method according to claim 1, wherein the presenting at least one question of a live streaming and an answering function entry corresponding to the at least one question comprises:

presenting, in the live streaming interface of the host, the at least one question and the answering function entry corresponding to each question in the form of a barrage.

8. The method according to claim 1, further comprising:

presenting the quantity of questions asked by the viewers corresponding to each question.

9. The method according to claim 8, further comprising:

presenting alarm information corresponding to the question of which the quantity of questions asked by the viewers exceeds a threshold of the quantity of questions asked, wherein the alarm information is used for indicating a processing priority of the corresponding question.

10. The method according to claim 1, further comprising:

acquiring a sum of the quantity of questions asked by the viewers corresponding to the at least one question;

comparing the sum of the quantity of questions asked by the viewers with at least two preset quantity thresholds respectively to obtain a comparison result; and outputting prompt information corresponding to the comparison result, the prompt information being used for prompting a degree of urgency of answering the at least one question.

11. An apparatus for processing live streaming information, comprising:

at least one memory configured to store program code; and at least one processor configured to read the program code and operate as instructed by the program code, the program code comprising:

first presentation code configured to cause the at least one processor to present at least one question asked by viewers directed to a host of a live streaming and an answering function entry corresponding to the at least one question, each question being obtained by aggregating questions asked by at least two viewers in a live streaming room of the host;

first transmission code configured to cause the at least one processor to transmit, based on the at least one question, a candidate question to the viewers;

receiving code configured to cause the at least one processor to receive, from a first terminal in response to selection of a trigger option displayed with the candidate question, a target question and increase a quantity of questions asked by viewers for the candidate question matching the target question;

second presentation code configured to cause the at least one processor to present, on a second terminal, the candidate question matching the target question and an updated quantity of questions asked by the viewers for the candidate question matching the target question;

third presentation code configured to cause the at least one processor to present, on the second terminal in response to an answering operation for the target question triggered based on the answering function entry, a receiving process of corresponding answer information; and second transmission code configured to cause the at least one processor to transmit, to the first terminal in response to an answering completion instruction for the target question, the received answer information of the target question to a viewer end.

12. The apparatus according to claim 11, wherein the present at least one question of a live streaming and an answering function entry corresponding to the at least one question comprises:

presenting a question answering function entry in a live streaming interface of the host; and presenting, in response to a triggering operation for the question answering function entry, the at least one question and the answering function entry corresponding to each question.

13. The apparatus according to claim 12, wherein the present a question answering function entry in a live streaming interface of the host comprises:

presenting, in the live streaming interface of the host, a floating button used as the question answering function entry; and the present, in response to a triggering operation for the question answering function entry, the at least one question and an answering function entry corresponding to each question comprises:

presenting a question answering interface in response to a triggering operation for the floating button; and presenting, in the question answering interface, the at least one question and the answering function entry corresponding to each question.

14. The apparatus according to claim 11, wherein the present at least one question of a live streaming and an answering function entry corresponding to the at least one question comprises:

presenting a card floating layer corresponding to each question in a stacked manner, and presenting, in the card floating layer corresponding to each question, an answering function entry for the corresponding question.

15. The apparatus according to claim 14, wherein the first presentation code is further configured to cause the at least one processor to:

slide out the card floating layer corresponding to the target question from the live streaming interface in response to the answering completion instruction for the target question, and present the card floating layer corresponding to a question adjacent to the target question.

16. The apparatus according to claim 14, wherein the first presentation code is further configured to cause the at least one processor to:

present, in the card floating layer corresponding to each question, a delayed answering function item of the corresponding question;

wherein the delayed answering function item is used for sliding out the card floating layer of the corresponding question from the live streaming interface in a case that a triggering operation for the delayed answering function item is received, and present the card floating layer under the slid-out card floating layer.

17. The apparatus according to claim 11, wherein the present at least one question of a live streaming and an answering function entry corresponding to the at least one question comprises:

presenting, in the live streaming interface of the host, the at least one question and the answering function entry corresponding to each question in the form of a barrage.

18. The apparatus according to claim 11, wherein the first presentation code is further configured to cause the at least one processor to:

present the quantity of questions asked by the viewers corresponding to each question.

19. The apparatus according to claim 18, wherein the first presentation code is further configured to cause the at least one processor to:

present alarm information corresponding to the question of which the quantity of questions asked by the viewers exceeds a threshold of the quantity of questions asked, wherein the alarm information is used for indicating a processing priority of the corresponding question.

20. A non-transitory computer-readable storage medium, storing computer program code that when executed by at least one processor causes the at least one processor to:

present at least one question asked by viewers directed to a host of a live streaming and an answering function entry corresponding to the at least one question, each question being obtained by aggregating questions asked by at least two viewers in a live streaming room of the host;

transmit, based on the at least one question, a candidate question to the viewers;

receive, from a first terminal in response to selection of a trigger option displayed with the candidate question, a target question and increase a quantity of questions asked by viewers for the candidate question matching the target question;

presenting, on a second terminal, the candidate question matching the target question and an updated quantity of questions asked by the viewers for the candidate question matching the target question;

present, on the second terminal in response to an answering operation for the target question triggered based on the answering function entry, a receiving process of corresponding answer information; and transmit, to the first terminal in response to an answering completion instruction for the target question, the received answer information of the target question to a viewer end.

\* \* \* \* \*